United States Patent
Seok et al.

(10) Patent No.: US 10,484,689 B2
(45) Date of Patent: Nov. 19, 2019

(54) APPARATUS AND METHOD FOR PERFORMING RATE-DISTORTION OPTIMIZATION BASED ON HADAMARD-QUANTIZATION COST

(71) Applicant: ELECTRONICS AND TELECOMMUNICATIONS RESEARCH INSTITUTE, Daejeon (KR)

(72) Inventors: Jin-Wuk Seok, Daejeon (KR); Myung-Seok Ki, Daejeon (KR); Youn-Hee Kim, Daejeon (KR); Hui-Yong Kim, Daejeon (KR); Jin-Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 812 days.

(21) Appl. No.: 15/015,456

(22) Filed: Feb. 4, 2016

(65) Prior Publication Data
US 2017/0195675 A1 Jul. 6, 2017

(30) Foreign Application Priority Data

Jan. 5, 2016 (KR) .................. 10-2016-0001238

(51) Int. Cl.
*H04N 19/147* (2014.01)
*H04N 19/103* (2014.01)
(Continued)

(52) U.S. Cl.
CPC ......... *H04N 19/147* (2014.11); *H04N 19/103* (2014.11); *H04N 19/15* (2014.11); *H04N 19/176* (2014.11)

(58) Field of Classification Search
None
See application file for complete search history.

(56) References Cited

U.S. PATENT DOCUMENTS

2010/0111163 A1* 5/2010 Yang .................. H04N 19/147
375/240.01
2014/0146884 A1 5/2014 Cho et al.
(Continued)

FOREIGN PATENT DOCUMENTS

KR 10-2014-0104064 * 2/2013
KR 10-2014-0081681 A 7/2014
(Continued)

OTHER PUBLICATIONS

Zhu et al. ("Fast Prediction Mode Decision With Hadamard Transform Based Rate-Distortion Cost Estimation for HEVC Intra Coding") (Year: 2013).*
(Continued)

*Primary Examiner* — William C Vaughn, Jr.
*Assistant Examiner* — Joseph Daniel A Towe
(74) *Attorney, Agent, or Firm* — NSIP Law

(57) ABSTRACT

An apparatus and method perform rate-distortion optimization based on cost. The encoding apparatus selects an encoding mode to be used to encode a target block from among multiple modes and performs computation for rate-distortion optimization in the encoding mode. The encoding apparatus calculates a cost of at least one of the multiple modes in relation to the encoding of the target block, and selects the encoding mode from among the multiple modes, based on the cost.

19 Claims, 24 Drawing Sheets

(51) Int. Cl.
H04N 19/176 (2014.01)
H04N 19/15 (2014.01)

(56) References Cited

U.S. PATENT DOCUMENTS

2014/0169452 A1    6/2014  Lim et al.
2014/0219331 A1    8/2014  Pai et al.
2017/0026645 A1*   1/2017  Zhou .................... H04N 19/124
2017/0264904 A1*   9/2017  Koval ................... H04N 19/176

FOREIGN PATENT DOCUMENTS

KR    10-2014-0104064 A    8/2014
KR    10-2014-0127385 A    11/2014
KR    10-2015-0093969 A    8/2015

OTHER PUBLICATIONS

Zhu, Jia, et al. "Fast prediction mode decision with hadamard transform based rate-distortion cost estimation for HEVC intra coding." Image Processing (ICIP), 2013 20th IEEE International Conference on. IEEE, 2013.

* cited by examiner

450 nRx2N

APPARATUS AND METHOD FOR PERFORMING RATE-DISTORTION OPTIMIZATION BASED ON HADAMARD-QUANTIZATION COST

CROSS REFERENCE TO RELATED APPLICATION

This application claims the benefit of Korean Patent Application No. 10-2016-0001238, filed Jan. 5, 2016, which is hereby incorporated by reference in its entirety into this application.

BACKGROUND OF THE INVENTION

1. Technical Field

The following embodiments generally relate to an apparatus and method for video coding and, more particularly, to an apparatus and method for performing rate-distortion optimization based on cost.

2. Description of the Related Art

The ITU-T/ISO/IEC Joint Collaborative Team on Video Coding (JCT-VC) has developed a High Efficiency Video Coding (HEVC) standard technology having encoding efficiency that is more than twice that of Advanced Video Codec (AVC)/H.264 while maintaining the same video quality. Further, ITU-T/ISO/IEC JCT-VC published the Final Draft International Standard (FDIS) on January, 2013 in relation to HEVC technology.

A large number of technologies have been added to HEVC technology in order to achieve high encoding performance Due to the addition of a large number of technologies, the complexity of an encoding apparatus using HEVC technology has greatly increased. Therefore, in order to utilize HEVC technology commercially, the encoding apparatus requires the improvement of an encoding speed based on the reduction of the complexity of the encoding apparatus.

In a typical video encoding apparatus, encoding based on a macroblock composed of 16×16 pixels is performed. In contrast, in an HEVC encoding apparatus, encoding is performed based on a Coding Tree Unit (CTU). A CTU may have a size of 64×64, 32×32, or 16×16. Typically, a CTU having a size of 64×64 is widely used. In the HEVC encoding apparatus, quadtree coding based on a CTU is performed. The CTU has the shape of a quadtree and is divided into coding units (CUs). In other words, a CU may be a block in a CTU. In the HEVC encoding apparatus, prediction and transform are performed based on CUs. Such a CU may have a size of 64×64, 32×32, 16×16 or 8×8. Further, the CU is configured to minimize Rate-Distortion Cost (RDC) while having a quadtree structure in the CTU.

To achieve the purpose of encoding and improve the efficiency of the encoding apparatus, a conventional HEVC encoding apparatus may calculate rate-distortion costs for 1) quadtree coding based on CTU, 2) the size of each block based on quadtree coding, and 3) the encoding mode of each block, and may determine quadtree coding and the encoding mode of the block depending on the calculated rate-distortion costs. Here, the encoding modes may include a skip mode, a merge mode, an inter mode, and an intra mode. Further, the HEVC encoding apparatus is configured to naturally perform a motion compensation step while determining quadtree coding and the encoding mode of the block.

As described above, the conventional HEVC encoding apparatus actually calculates rate-distortion cost based on the results of encoding and decoding after the performance of both encoding and decoding has been completed. The conventional HEVC encoding apparatus consumes a lot of time in encoding. Further, when a Rate-Distortion Optimized Quantization (RDOQ) method is applied to the HEVC encoding apparatus, the HEVC encoding apparatus performs such a large number of encoding operations that fast encoding for practical use in the real world is actually impossible.

In order to overcome the above-described disadvantages, an HEVC test model, which is reference HEVC software, uses 1) a method for rapidly determining skip and merge, 2) a method for reducing the computational load of Asymmetric Motion Partitioning (AMP), and 3) a method for omitting intra-prediction when a residual signal is small upon performing inter-prediction. However, since these methods basically calculate rate-distortion cost, the additional calculation of rate-distortion cost may be reduced, but there is a limitation on the extent of reduction of the basic encoding computation time.

In relation to technology for performing block encoding using rate-distortion cost, Korean Patent Application Publication No. 2014-0104064 and U.S. Patent Application Publication No. 2014-0146884 are disclosed.

SUMMARY OF THE INVENTION

An embodiment is intended to provide an apparatus and method for rapidly determining an encoding mode.

Another embodiment is intended to provide an apparatus and method that use similar rate-distortion costs, thus enabling the mode for block encoding to be determined without calculating rate-distortion costs of individual modes.

In accordance with an aspect of the present invention to accomplish the above objects, there is provided an encoding apparatus, including a selection unit for selecting an encoding mode to be used to encode a target block from among multiple modes; and a computation unit for performing computation for rate-distortion optimization in the encoding mode, wherein the selection unit calculates a cost of at least one of the multiple modes in relation to encoding of the target block, and selects the encoding mode from among the multiple modes, based on the cost.

The multiple modes may include a skip mode, a merge mode, an inter mode, and an intra mode.

The selection unit may calculate costs of the multiple modes in relation to encoding of the target block.

The encoding mode may be a mode having a minimum cost among the multiple costs.

The cost may be a similar rate-distortion cost that is a value related to rate-distortion cost when the mode is used for encoding the target block.

The cost may be calculated based on a model parameter for the corresponding mode, a Hadamard value in the mode, a Lagrangian multiplier in the mode, and a number of bits occurring in the mode.

The Hadamard value may be calculated based on both the target block and a prediction block for the target block.

The cost may be a sum of a first value and a second value.

The first value may be a product of a model parameter for the corresponding mode and a Hadamard value in the mode.

The second value may be a product of a Lagrangian multiplier in the mode and an estimated value of a number of bits required for description of the mode.

The cost of the mode may be calculated without using a reconstructed block for the target block.

The multiple modes may include a merge mode and a skip mode.

The selection unit may determine whether the encoding mode of the target block is the skip mode, using a prediction block in the merge mode and the target block.

The selection unit may determine the encoding mode of the target block to be the skip mode when a level of a Hadamard value in the merge mode is 0.

The selection unit may be configured to, when a level of a Hadamard value in the corresponding mode is equal to or greater than a predefined value, perform motion compensation at a depth subsequent to a current depth of the target block without performing motion compensation at the current depth.

The multiple modes may include an inter mode, and the selection unit may determine whether to perform prediction in the inter mode upon encoding the target block, based on both a level of a Hadamard value in the inter mode and a first threshold function.

The multiple modes may include a skip mode, a merge mode, an inter mode, and an intra mode, and the selection unit may set modes such that prediction in the skip mode and in the merge mode is performed, and such that prediction of the target block in the inter mode is performed while prediction of the target block in the intra mode is omitted if a level of a Hadamard value in the inter mode is in a high cost state.

The high cost state may indicate a state in which the level of the Hadamard value in the inter mode has a value that causes prediction to be performed at a subsequent depth of the target block.

The selection unit may determine whether to perform prediction in the intra mode depending on a result of prediction in the inter mode.

The selection unit may determine whether to omit prediction in the intra mode and to perform prediction in the inter mode upon encoding the target block, based on both the level of the Hadamard value in the inter mode and a second threshold function.

The multiple modes may include a merge mode and an inter mode, and the selection unit may determine whether to perform prediction in the inter mode, using both a prediction block in the merge mode and the target block.

The multiple modes may include a merge mode and an inter mode, and the selection unit may determine whether to perform prediction in the inter mode, using both a prediction block in the merge mode and the target block if a Hadamard value in the merge mode is in a high cost state.

The multiple modes may include a skip mode, a merge mode, an inter mode, and an intra mode, and the selection unit may determine a mode in which motion compensation is to be performed, among the multiple modes, using both the target block and a prediction block for the target block if levels of Hadamard values in the multiple modes are identical to each other.

The computation unit may not perform computation for rate-distortion optimization in modes other than a mode selected as the encoding mode, from among the multiple modes.

In accordance with another aspect of the present invention to accomplish the above objects, there is provided an encoding method, including selecting an encoding mode to be used to encode a target block from among multiple modes; and performing computation for rate-distortion optimization in the encoding mode, wherein selecting the encoding mode includes calculating a cost of at least one of the multiple modes in relation to encoding of the target block; and selecting the encoding mode from among the multiple modes, based on the cost.

In addition, other methods, apparatuses, and systems for implementing the present invention, and a computer-readable storage medium storing a computer program for executing the method, are further provided.

BRIEF DESCRIPTION OF THE DRAWINGS

The above and other objects, features and advantages of the present invention will be more clearly understood from the following detailed description taken in conjunction with the accompanying drawings, in which:

FIGS. 14A, 14B, and 14C are flowcharts showing a method for determining an inter mode and an intra mode according to an embodiment, wherein FIG. 14A illustrates a method for determining an inter mode and an intra mode according to an embodiment, FIG. 14B illustrates a method for determining an inter mode according to an embodiment, and FIG. 14C illustrates a method for determining an intra mode according to an embodiment.

DESCRIPTION OF THE PREFERRED EMBODIMENTS

Figure 1:
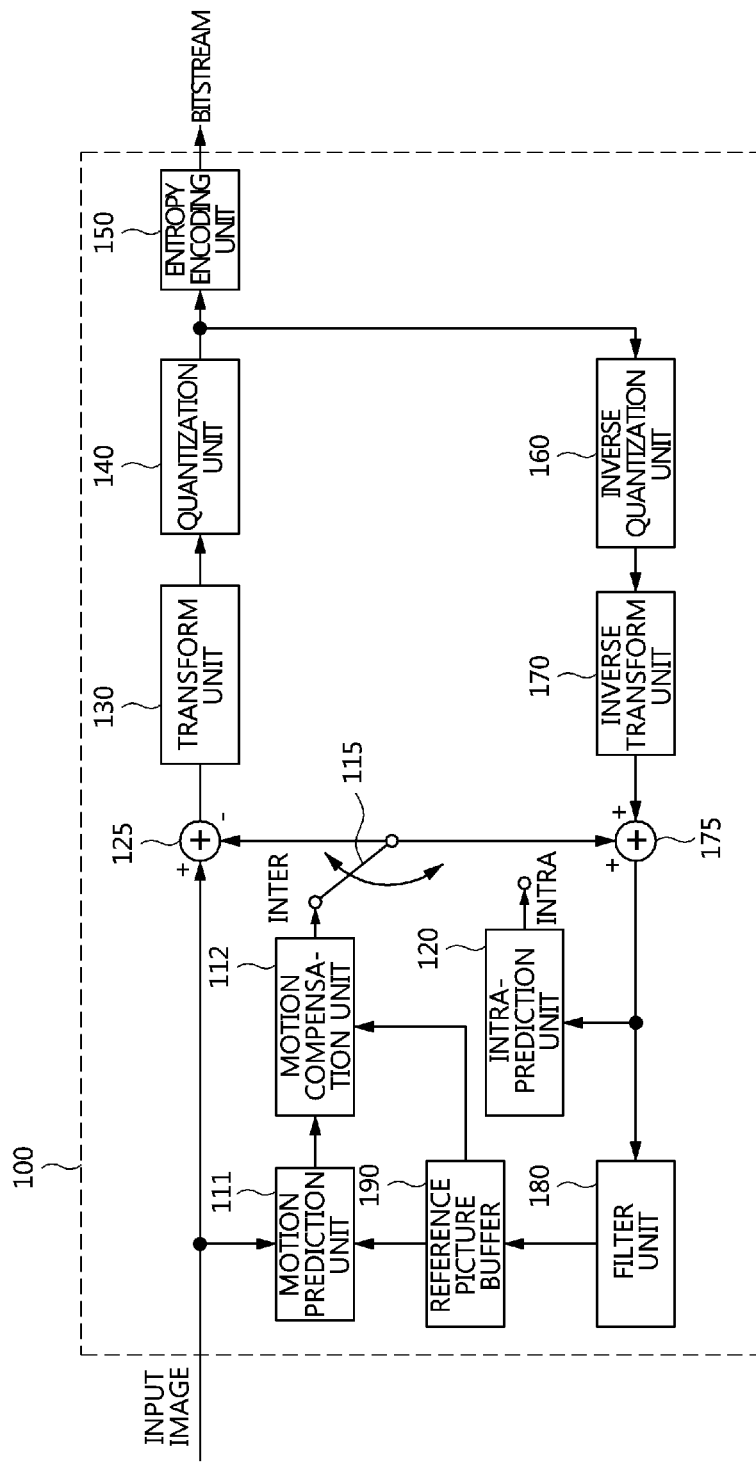
FIG. 1 is a block diagram showing the configuration of an embodiment of an encoding apparatus to which the present invention is applied.

Detailed description of the following exemplary embodiments will be made with reference to the attached drawings illustrating specific embodiments. These embodiments are described so that those having ordinary knowledge in the technical field to which the present disclosure pertains can easily practice the embodiments. It should be noted that various embodiments are different from each other, but do not need to be mutually exclusive to each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

The terms used herein are for the purpose of describing particular embodiments only and are not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element, or intervening elements may be present.

Also, element modules described in the embodiments of the present invention are independently shown in order to indicate different characteristic functions, and but this does not mean that each of the element modules is formed of a separate piece of hardware or software. That is, element modules are arranged and included, for convenience of description, and at least two of the element units may form one element unit or one element may be divided into multiple element units and the multiple element units may perform functions. An embodiment into which the elements are integrated or an embodiment from which some elements are separated is included in the scope of the present invention as long as it does not depart from the essence of the present invention.

Further, in the present invention, some elements are not essential elements for performing essential functions, but may be optional elements for improving only performance. The present invention may be implemented using only essential elements for implementing the essence of the present invention, excluding elements used to improve only performance, and a structure including only essential elements, excluding optional elements used only to improve performance, is included in the scope of the present invention. In the description of the embodiments, repeated descriptions and descriptions of known functions and configurations which have been deemed to make the gist of the present invention unnecessarily obscure will be omitted below.

Hereinafter, "image" may mean a single picture constituting part of a video, or may mean the video itself. For example, "encoding and/or decoding of an image" may mean "encoding and/or decoding of a video", and may also mean "encoding and/or decoding of any one of images constituting the video".

First, the terms used in the embodiments will be described below.

Unit: this may be an area generated by the partitioning of one image when encoding and decoding the image. A single image may be partitioned into multiple units. Upon encoding and decoding an image, predefined processing may be performed on each unit. Depending on the function, units such as a block, a macroblock, a Coding Unit (CU), a Prediction Unit (PU), and a Transform Unit (TU) are used. A single unit may be further partitioned into lower units having a smaller size than that of the unit.

Block partition information may include information about the depth of the unit. The depth information may indicate the number of times and/or the degree to which the unit is partitioned.

A single unit may be hierarchically partitioned into multiple lower units while having depth information based on a tree structure. In other words, the unit and lower units, generated by partitioning the unit, may correspond to a node and child nodes of the node, respectively. The individual partitioned lower units may have depth information. The depth information of the unit indicates the number of times and/or the degree to which the unit is partitioned, and thus the partition information of the lower units may include information about the sizes of the lower units.

In a tree structure, the top node may correspond to the initial node before partitioning. The top node may be referred to as a 'root node'. Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level '3' may denote a unit generated when the initial unit has been partitioned three times. The leaf node may be a bottom node, and may have the maximum depth value.

Block: A block may be an M×N array of samples, where M and N may be positive integers, respectively. A block may typically mean an array of two-dimensional (2D) samples, and each sample may be a pixel or pixel value.

Transform Unit (TU): A TU may be the basic unit of residual signal encoding and/or residual signal decoding, such as transform, inverse transform, quantization, inverse quantization, transform coefficient encoding, and transform coefficient decoding. A single TU may be partitioned into multiple TUs, each having a smaller size.

Parameter set: A parameter set may correspond to information about the header of the structure of a bitstream. For example, a parameter set may include a sequence parameter set, a picture parameter set, an adaptation parameter set, etc.

Rate-distortion optimization: An encoding apparatus may use rate-distortion optimization so as to provide higher encoding efficiency by utilizing combinations of the size of a CU, a prediction mode, the size of a prediction unit, motion information, and the size of a TU.

A rate-distortion optimization scheme may calculate rate-distortion costs of respective combinations so as to select an optimal combination from among the combinations. The rate-distortion costs may be calculated using the following Equation (1). Generally, a combination enabling the rate-distortion cost to be minimized may be selected as the optimal combination in the rate-distortion optimization scheme.

$$D+\lambda*R \quad (1)$$

Here, D may denote distortion. D may be the mean of squares of differences (mean square error) between original transform coefficients and reconstructed transform coefficients in a transform block.

R denotes the rate, which may denote a bit rate using related context information.

λ denotes a Lagrangian multiplier. R may include not only encoding parameter information, such as a prediction mode, motion information, and a coded block flag, but also bits generated due to the encoding of transform coefficients.

The encoding apparatus performs procedures such as inter-prediction and/or intra-prediction, transform, quantization, entropy coding, inverse quantization, and inverse transform, so as to calculate precise D and R, but those procedures may greatly increase the complexity of the encoding apparatus.

FIG. 1 is a block diagram showing the configuration of an embodiment of an encoding apparatus to which the present invention is applied.

An encoding apparatus 100 may be a video encoding apparatus or an image encoding apparatus. A video may include one or more images (pictures). The encoding apparatus 100 may sequentially encode one or more images of the video over time.

Referring to FIG. 1, the encoding apparatus 100 includes a motion prediction unit 111, a motion compensation unit 112, an intra-prediction unit 120, a switch 115, a subtractor 125, a transform unit 130, a quantization unit 140, an entropy encoding unit 150, an inverse quantization unit 160, an inverse transform unit 170, an adder 175, a filter unit 180, and a reference picture buffer 190.

The encoding apparatus 100 may perform encoding on an input image in an intra mode and/or an inter mode. Further, the encoding apparatus 100 may generate a bitstream via encoding on the input image, and may output the generated bitstream. When the intra mode is used, the switch 115 may switch to the intra mode, whereas when the inter mode is used, the switch 115 may switch to the inter mode.

The encoding apparatus 100 may generate a prediction block for an input block in the input image. Further, after the prediction block has been generated, the encoding apparatus 100 may encode a residual between the input block and the prediction block. The input image may be called a 'current image', which is the target to be currently encoded. The input block may be called a 'current block', which is the target to be currently encoded.

When the prediction mode is an intra mode, the intra-prediction unit 120 may use pixel values of previously encoded neighboring blocks around the current block as reference pixels. The intra-prediction unit 120 may perform spatial prediction using the reference pixels and generate prediction samples for the input block via spatial prediction.

When the prediction mode is an inter mode, the motion prediction unit 111 may search a reference image for an area most closely matching the input block in a motion prediction procedure, and may derive a motion vector using the found area. The reference image may be stored in the reference picture buffer 190. More specifically, the reference image may be stored in the reference picture buffer 190 when the encoding and/or decoding of the reference image are processed.

The motion compensation unit 112 may generate a prediction block by performing motion compensation using a motion vector. Here, the motion vector may be a two-dimensional (2D) vector used for inter-prediction. Further, the motion vector may indicate an offset between the current image and the reference image.

The subtractor 125 may generate a residual block using the residual between the input block and the prediction block. The residual block is also referred to as a 'residual signal'.

The transform unit 130 may generate a transform coefficient by transforming the residual block, and may output the transform coefficient. Here, the transform coefficient may be a coefficient value generated by transforming the residual block. When a transform skip mode is used, the transform unit 130 may omit transforming the residual block.

By applying quantization to the transform coefficient, a quantized transform coefficient level may be generated. Here, in the embodiments, the quantized transform coefficient level may also be referred to as a 'transform coefficient'.

The quantization unit 140 may generate a quantized transform coefficient level by quantizing the transform coefficient depending on a quantization parameter, and may output the quantized transform coefficient level. In this case, the quantization unit 140 may quantize the transform coefficient using a quantization matrix.

The entropy encoding unit 150 may generate a bitstream by performing probability distribution-based entropy encoding on values, calculated by the quantization unit 140, or on encoding parameter values, calculated in the encoding procedure, and may output the bitstream.

The entropy encoding unit 150 may perform entropy encoding on information required to decode the image, in addition to the pixel information of the image. For example, the information required to decode the image may include syntax elements or the like.

The encoding parameters may be information required for encoding and/or decoding. The encoding parameters may include information encoded by the encoding apparatus and transferred to a decoding apparatus, and may also include information that may be derived in the encoding or decoding procedure. For example, information transferred to the decoding apparatus may include syntax elements.

For example, the encoding parameters may include values or statistical information, such as a prediction mode, a motion vector, a reference picture index, an encoding block pattern, the presence or absence of a residual signal, a transform coefficient, a quantized transform coefficient, a quantization parameter, a block size, and block partition information. The prediction mode may be an intra-prediction mode or an inter-prediction mode.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be a block-based residual signal.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, a coding method such as exponential Golomb, Context-Adaptive Variable Length Coding (CAVLC), or Context-Adaptive Binary Arithmetic Coding (CABAC) may be used. For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform entropy encoding using the derived binarization method or probability model.

When the encoding apparatus 100 performs encoding via inter-prediction, an encoded current image may be used as a reference image for additional image(s) to be subsequently processed. Therefore, the encoding apparatus 100 may decode the encoded current image and store the decoded image as a reference image. For decoding, inverse quantization and inverse transform on the encoded current image may be processed.

The quantized coefficient may be inversely quantized by the inverse quantization unit 160, and may be inversely transformed by the inverse transform unit 170. The coefficient that has been inversely quantized and inversely transformed may be added to the prediction block by the adder 175. The inversely quantized and inversely transformed coefficient and the prediction block are added, and then a reconstructed block may be generated.

The reconstructed block may undergo filtering through the filter unit 180. The filter unit 180 may apply one or more of a deblocking filter, a Sample Adaptive Offset (SAO) filter, and an Adaptive Loop Filter (ALF) to the reconstructed block or a reconstructed picture. The filter unit 180 may also be referred to as an 'adaptive in-loop filter'.

The deblocking filter may eliminate block distortion occurring at the boundaries of blocks. The SAO filter may add a suitable offset value to a pixel value so as to compensate for a coding error. The ALF may perform filtering based on the result of comparison between the reconstructed block and the original block. The reconstructed block, having undergone filtering through the filter unit 180, may be stored in the reference picture buffer 190.

Figure 2:
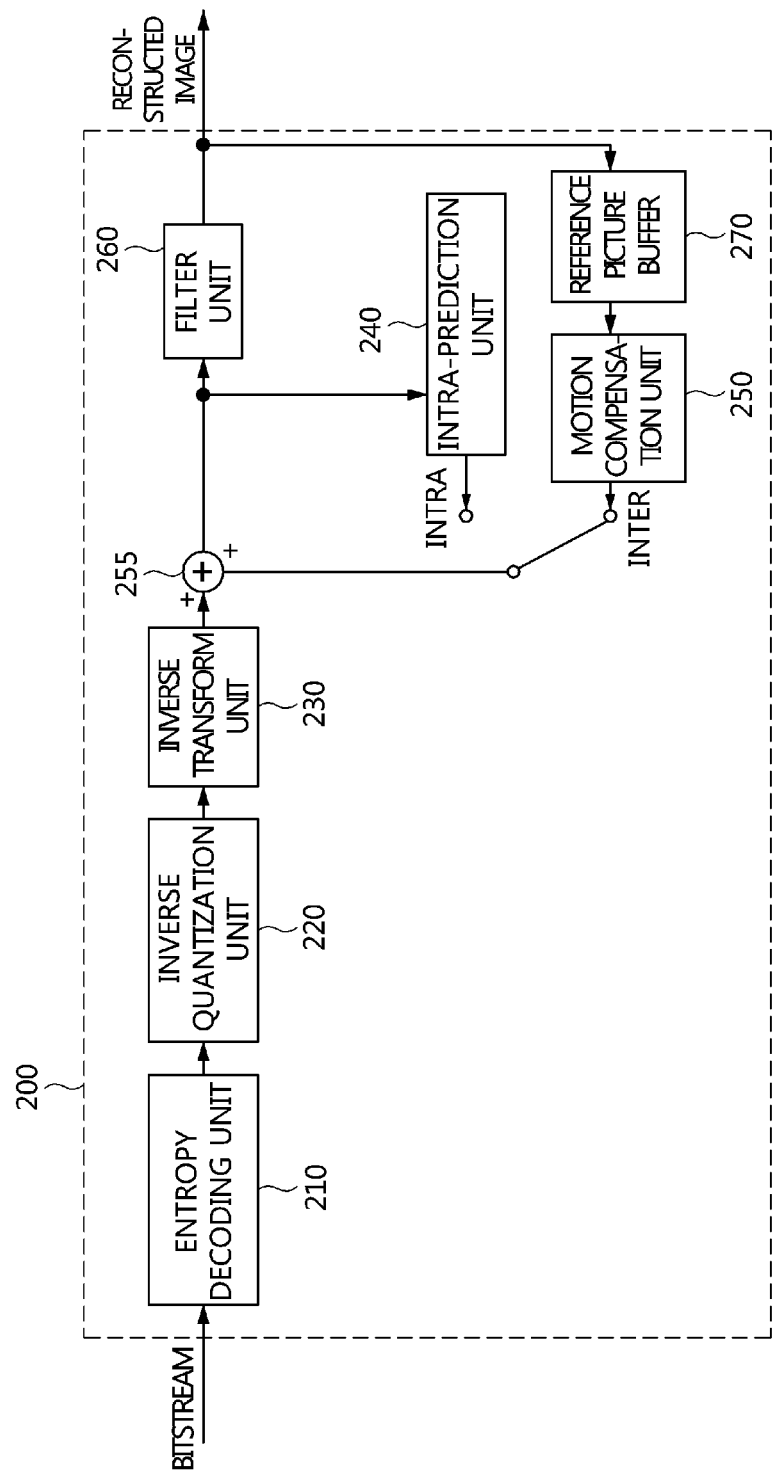
FIG. 2 is a block diagram showing the configuration of an embodiment of a decoding apparatus to which the present invention is applied.

FIG. 2 is a block diagram showing the configuration of an embodiment of a decoding apparatus to which the present invention is applied.

A decoding apparatus 200 may be a video decoding apparatus or an image decoding apparatus.

Referring to FIG. 2, the decoding apparatus 200 may include an entropy decoding unit 210, an inverse quantization unit 220, an inverse transform unit 230, an intra-prediction unit 240, a motion compensation unit 250, an adder 255, a filter unit 260, and a reference picture buffer 270.

The decoding apparatus 200 may receive a bitstream output from the encoding apparatus 100. The decoding apparatus 200 may perform decoding on the bitstream in an intra mode or an inter mode. Further, the decoding apparatus 200 may generate a reconstructed image via decoding and may output the reconstructed image.

When the prediction mode used for decoding is an intra mode, the switch may be operated to switch to the intra mode. When the prediction mode used for decoding is an inter mode, the switch may be operated to switch to the inter mode.

The decoding apparatus 200 may acquire a reconstructed residual block from the input bitstream, and may generate a prediction block. When the reconstructed residual block and the prediction block are acquired, the decoding apparatus 200 may generate a reconstructed block by adding the reconstructed residual block to the prediction block.

The entropy decoding unit 210 may generate symbols by performing probability distribution-based entropy decoding on the bitstream. The generated symbols may include quantized coefficient-format symbols. Here, the entropy decoding method may be similar to the above-described entropy encoding method. That is, the entropy decoding method may be the reverse procedure of the above-described entropy encoding method.

The quantized coefficient may be inversely quantized by the inverse quantization unit 220 and inversely transformed by the inverse transform unit 230. As a result of inversely quantizing and inversely transforming the quantized coefficient, a reconstructed residual block may be generated. Here, the inverse quantization unit 220 may apply a quantization matrix to the quantized coefficient.

When the intra mode is used, the intra-prediction unit 240 may generate a prediction block by performing spatial prediction using the pixel values of previously encoded neighboring blocks around a current block. When the inter mode is used, the motion compensation unit 250 may generate a prediction block by performing motion compensation, which uses a motion vector and reference images stored in the reference picture buffer 270.

The reconstructed residual block and the prediction block may be added to each other by the adder 255. The block generated when the reconstructed residual block and the prediction block are added to each other may undergo filtering through the filter unit 260. The filter unit 260 may apply one or more of a deblocking filter, an SAO filter, and an ALF to the reconstructed block or the reconstructed picture. The filter unit 260 may output the reconstructed image (block). The reconstructed image may be stored in the reference picture buffer 270 and may then be used for inter-prediction.

Figure 3:
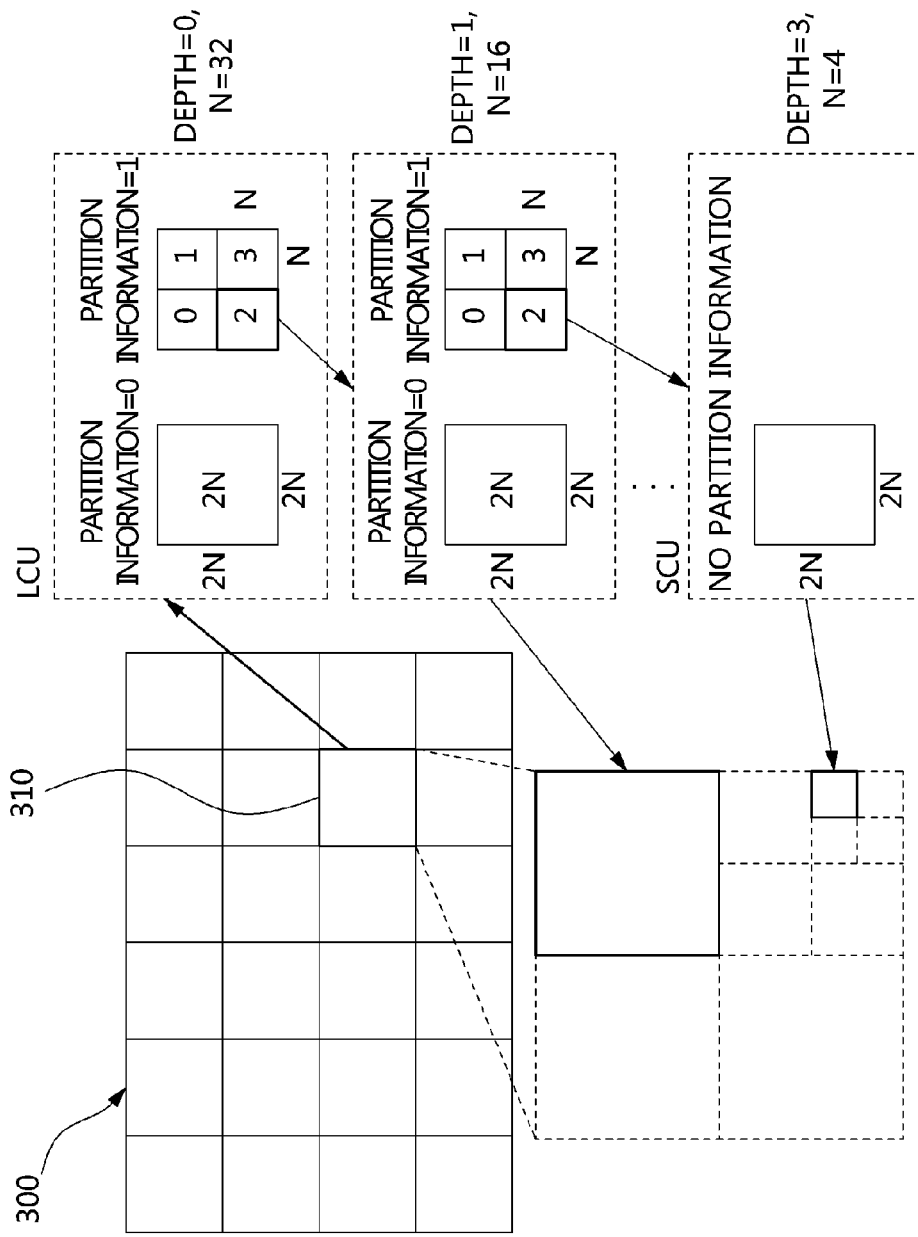
FIG. 3 is a diagram schematically showing the partitioning structure of an image when the image is encoded and decoded.

FIG. 3 is a diagram schematically showing the partition structure of an image when the image is encoded and decoded.

To efficiently partition the image, a Coding Unit (CU) may be used in encoding and decoding. The term "unit" may be the term for collectively referring to a block that includes 1) syntax elements and 2) image samples. For example, "partition of a unit" may mean "partition of a block corresponding to the unit".

Referring to FIG. 3, an image 300 is sequentially partitioned in units of a Largest Coding Unit (LCU), and the partition structure thereof is determined on an LCU basis. Here, "LCU" may be used to have the same meaning as a Coding Tree Unit (CTU).

The partition structure may mean the distribution of CUs in an LCU 310. The CU may be a unit required to efficiently encode an image. Such a distribution may be determined depending on whether a single CU is partitioned into four CUs. The width and length of a CU generated by partitioning may be respectively half of the width and the length of the CU before partitioning. Each partitioned CU may be recursively partitioned into four CUs, the widths and lengths of which are half of those of the corresponding CU, in the same way.

At this time, the partitioning of the CUs may be recursively performed up to a predefined depth. Depth information may be information indicating the size of CUs. Further, the depth information may be stored for each CU. For example, the depth of the LCU may be 0, and the depth of a Smallest Coding Unit (SCU) may be a predefined maximum depth. Here, the LCU may be a coding unit having the maximum coding unit size, as described above, and the SCU may be a coding unit having the smallest coding unit size.

Partitioning starts at the LCU 310, and the depth of the CU is increased by '1' via partitioning whenever the width and length of the CU are reduced by half. At each depth, a CU that is not partitioned may have a size of 2N×2N. In the case of a CU that is partitioned, a CU having a size of 2N×2N may be partitioned into four CUs, each having a size of N×N. The size of N is halved whenever the depth is increased by 1.

Referring to FIG. 3, the size of an LCU having a depth of 0 may be 64×64 pixels. '0' may be the minimum depth. The size of an SCU having a depth of 3 may be 8×8 pixels, where 3 may be the maximum depth. Here, the CU of 64×64 pixels corresponding to the LCU may be represented by a depth of 0. The CU of 32×32 pixels may be represented by a depth of 1. The CU of 16×16 pixels may be represented by a depth of 2. The CU of 8×8 pixels corresponding to the SCU may be represented by a depth of 3.

Further, information about whether the CU is partitioned may be represented by the partition information of the CU. The partition information may be one bit of information. All CUs except the SCU may have partition information. For example, when the value of the partition information is 0, the CU may not be partitioned, whereas when the value of the partition information is 1, the CU may be partitioned.

FIGS. 4A to 4H are diagrams showing the shape of a prediction unit (PU) that can be included in the coding unit (CU).

Among CUs partitioned from the LCU, each CU that is not partitioned any further may be separated into one or more PUs. This processing may also be referred to as "partitioning".

A PU may be the basic unit of prediction. A PU may be encoded and decoded in any one of a skip mode, an inter mode, and an intra mode. The PU may be separated in various shapes depending on the mode.

Figure 4A:
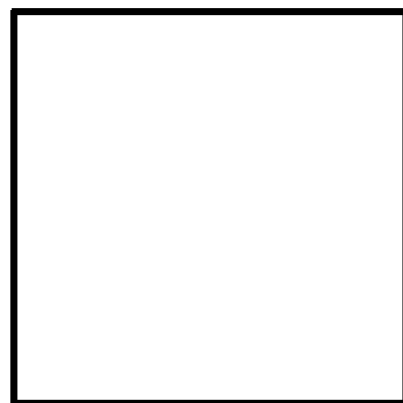
FIGS. 4A to 4H are diagrams showing the shape of a Prediction Unit (PU) that can be included in a Coding Unit (CU)
Figure 4B:
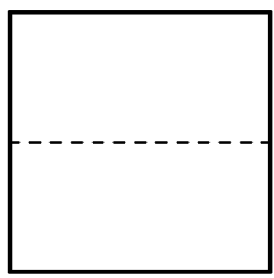
Figure 4C:
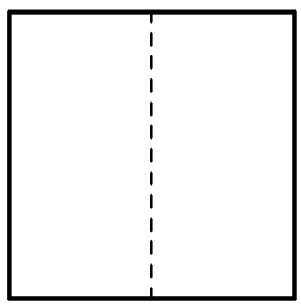
Figure 4D:
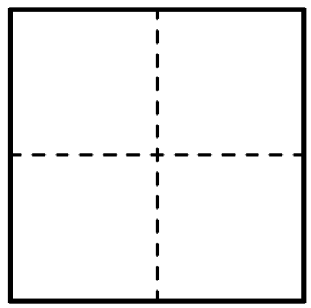
Figure 4E:
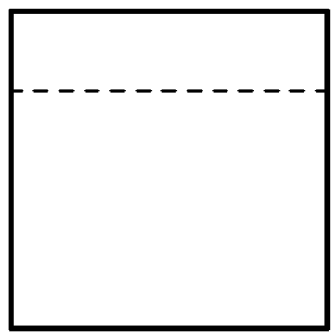
Figure 4F:
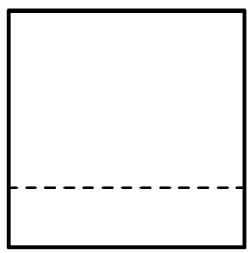
Figure 4G:
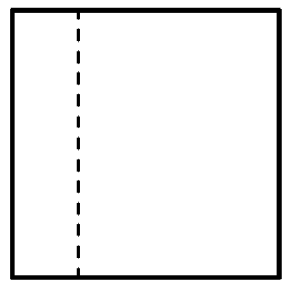
Figure 4H:
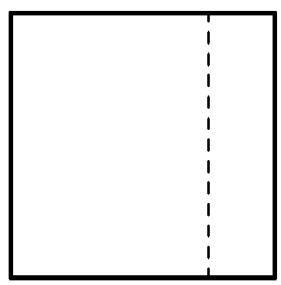

As shown in FIG. 4A, in the skip mode, partitioning may not be performed in the CU. In the skip mode, a 2N×2N mode 410 having the same size as the CU may be supported.

In the inter mode, eight different shapes into which the CU is separable may be supported. For example, in the inter mode, a 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In the intra mode, the 2N×2N mode 410 and the N×N mode 425 may be supported.

Figure 5:
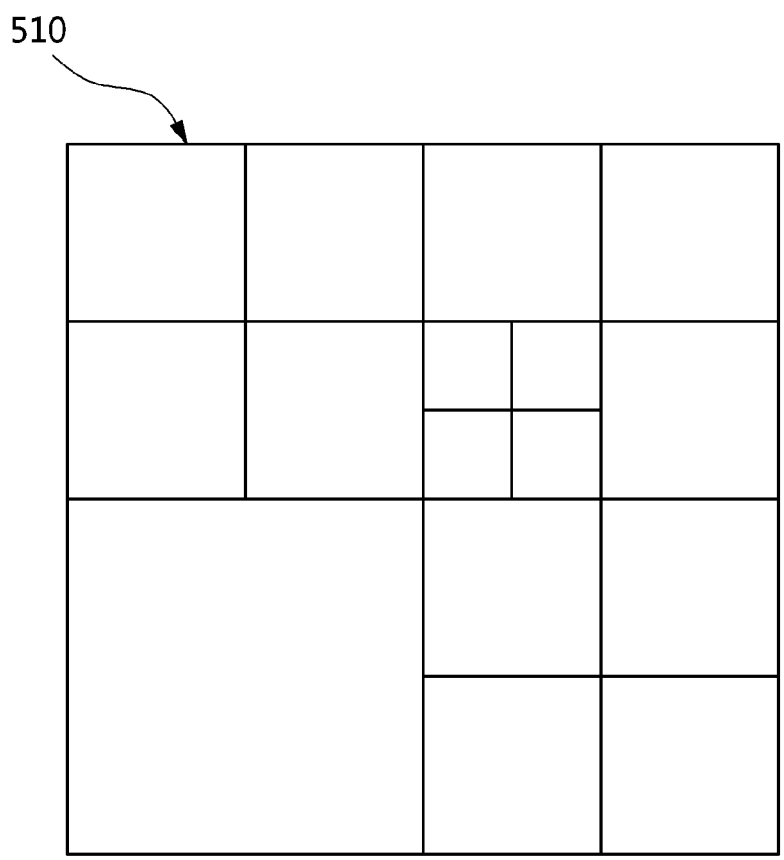
FIG. 5 is a diagram showing the shape of a Transform Unit (TU) that can be included in a CU.

FIG. 5 is a diagram showing the shape of a Transform Unit (TU) that can be included in the CU.

The TU may be a basic unit used for transform, quantization, inverse transform, and inverse quantization procedures in the CU. The TU may have the shape of a square or a rectangle.

Among the CUs partitioned from the LCU, each CU that is not partitioned into CUs any further may be separated into one or more TUs. At this time, the partitioning structure of a TU may be a quad-tree structure. For example, as shown in FIG. 5, a single CU 510 may be partitioned one or more times according to the quad-tree structure. Through such partitioning, a single CU 510 may be composed of TUs having various sizes.

Figure 6:
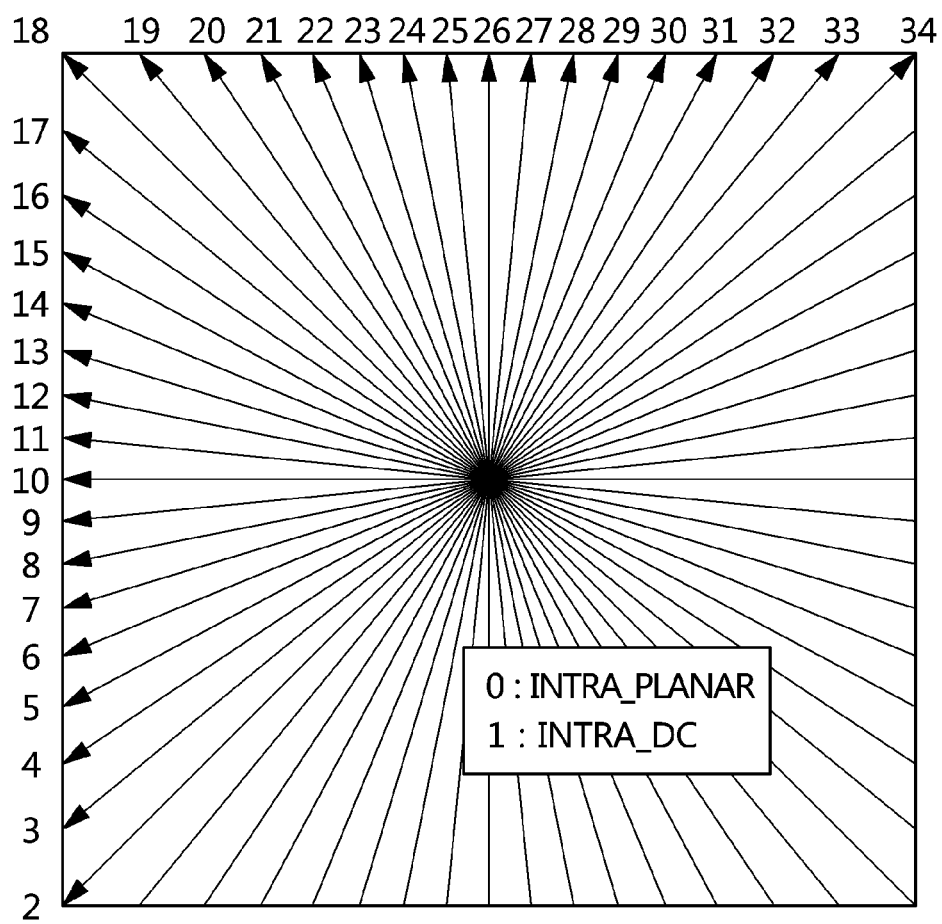
FIG. 6 is a diagram showing an embodiment of an intra-prediction procedure.

FIG. 6 is a diagram showing an embodiment of an intra-prediction procedure.

The number of intra-prediction modes may be fixed at 35 regardless of the size of a prediction unit.

As shown in FIG. 6, prediction modes may include two non-directional modes and 33 directional modes. The two non-directional modes may include a DC mode and a planar mode.

The number of prediction modes may differ depending on the types of color components. For example, the number of prediction modes may differ depending on whether a color component is a luminance (luma) signal or a chrominance (chroma) signal.

A PU may have a square shape having a size of N×N or 2N×2N. The N×N size may include sizes of 4×4, 8×8, 16×16, 32×32, and 64×64. The unit of PU may have the size of at least one of a CU, a PU, and a TU.

Intra encoding and/or decoding may be performed using sample values or encoding parameters included in neighboring reconstructed units.

Figure 7:
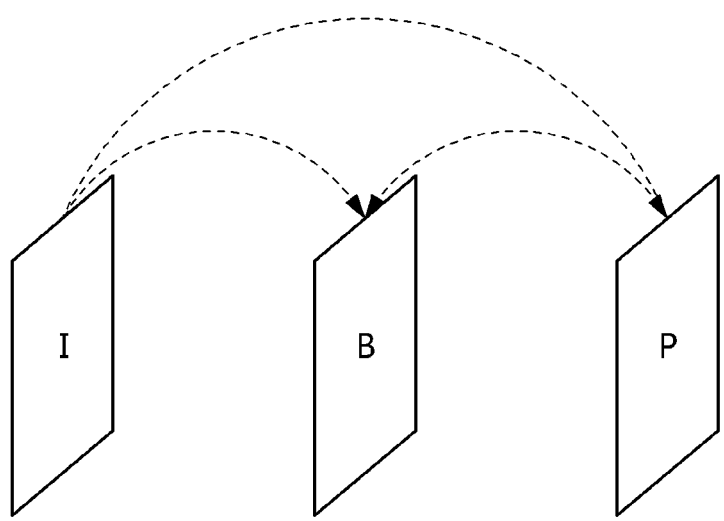
FIG. 7 is a diagram showing an embodiment of an inter-prediction procedure.

FIG. 7 is a diagram showing an embodiment of an inter-prediction procedure.

The rectangles shown in FIG. 7 may indicate images (or pictures). Further, the arrows in FIG. 7 may indicate a prediction direction. That is, an image may be encoded and/or decoded according to the prediction direction.

According to the encoding type, respective images (or pictures) may be classified into an Intra Picture (I picture), a Uni-prediction Picture (P picture), and a Bi-prediction Picture (B picture). Each picture may be encoded depending on the encoding type of the picture.

When the image to be encoded is an I picture, the image itself may be encoded without inter-prediction being performed. When the image to be encoded is a P picture, the image may be encoded via inter-prediction, which uses a reference image only in a forward direction. When the image to be encoded is a B picture, it may be encoded using inter-prediction, which uses reference pictures in both a forward direction and a reverse direction, and may be encoded via inter-prediction, which uses reference pictures in any one of a forward direction and a reverse direction.

The images of the P picture and B picture that are encoded and/or decoded using reference images may be regarded as images in which inter-prediction is used.

In the following description, inter-prediction according to an embodiment will be described in detail.

Inter-prediction may be performed using reference pictures and motion information. Further, inter-prediction may be performed using the above-described skip mode.

A reference picture may be at least one of a picture previous to a current picture and a picture subsequent to the current picture. Here, the inter-prediction may be prediction performed on the block of the current picture based on the reference picture. Here, the reference picture may be the image used for the prediction of a block.

Here, an area in the reference picture may be specified by utilizing a reference picture index (refIdx), which indicates the reference picture, and a motion vector, which will be described later.

The inter-prediction may be performed by selecting a reference picture and a reference block corresponding to the current block within the reference picture, and generating a prediction block for the current block using the selected reference block. The current block may be the block that is the target to be currently encoded or decoded, among the blocks in the current picture.

The motion information may be derived during inter-prediction by each of the encoding apparatus 100 and the decoding apparatus 200. Further, the derived motion information may be used to perform inter-prediction.

In this case, each of the encoding apparatus 100 and the decoding apparatus 200 may improve encoding and/or decoding efficiency by utilizing the motion information of a reconstructed neighboring block and/or the motion information of a collocated block (col block). The col block may be a block corresponding to the current block in the already reconstructed collocated picture (col picture). The reconstructed neighboring block may be a block that is present in the current picture and that has already been reconstructed via encoding and/or decoding. Further, the reconstructed block may be a neighboring block that is adjacent to the current block and/or a block located at the external corner of the current block. Here, the block located at the external corner of the current block may be a block vertically adjacent to a neighboring block that is horizontally adjacent to the current block, or a block horizontally adjacent to a neighboring block that is vertically adjacent to the current block.

Each of the encoding apparatus 100 and the decoding apparatus 200 may determine the block that is present at the position spatially corresponding to the current block in the col picture, and may determine a predefined relative position based on the determined block. The predefined relative position may be an external and/or internal position in the block present at the position spatially corresponding to the current block. Further, each of the encoding apparatus 100 and the decoding apparatus 200 may derive a col block based on the predefined relative position. Here, the col picture may be one of one or more reference pictures included in a reference picture list.

The method for deriving motion information may vary according to the prediction mode of the current block. For example, as prediction modes applied to inter-prediction, there may be an Advanced Motion Vector Predictor (AMVP), a merge mode, etc.

For example, when an AMVP is used as the prediction mode, each of the encoding apparatus 100 and the decoding apparatus 200 may generate a predicted motion vector candidate list using the motion vectors of reconstructed neighboring blocks and/or the motion vector of the col block. The motion vectors of reconstructed neighboring blocks and/or the motion vector of the col block may be used as predicted motion vector candidates.

The bitstream generated by the encoding apparatus 100 may include a predicted motion vector index. The predicted motion vector index may indicate an optimal predicted motion vector selected from among the predicted motion vector candidates included in the predicted motion vector candidate list. Through the bitstream, the predicted motion vector index may be transmitted from the encoding apparatus 100 to the decoding apparatus 200.

The decoding apparatus 200 may select a predicted motion vector for the current block from among predicted motion vector candidates included in the predicted motion vector candidate list using the predicted motion vector index.

The encoding apparatus 100 may calculate a Motion Vector Difference (MVD) between the motion vector of the current block and the predicted motion vector, and may encode the MVD. The bitstream may include the encoded MVD. The MVD may be transmitted from the encoding apparatus 100 to the decoding apparatus 200 through a bitstream. Here, the decoding apparatus 200 may decode the received MVD. The decoding apparatus 200 may derive the motion vector of the current block using the sum of the decoded MVD and the predicted motion vector.

The bitstream may include a reference picture index or the like indicating a reference picture. The reference picture index may be transmitted from the encoding apparatus 100 to the decoding apparatus 200 through a bitstream. The decoding apparatus 200 may predict the motion vector of the current block using pieces of motion information of neighboring blocks, and may derive the motion vector of the current block using the difference between the predicted motion vector and the motion vector. The decoding apparatus 200 may generate a prediction block for the current block based on information about the derived motion vector and the reference picture index.

As another example of the method for deriving motion information, a merge method is used. The term 'merge' may mean the merging of motion of multiple blocks. 'Merge' may mean that the motion information of one block is also applied to other blocks. When merging is applied, each of the encoding apparatus 100 and the decoding apparatus 200 may generate a merge candidate list using pieces of motion information of respective reconstructed neighboring blocks and/or the motion information of the col block. The motion information may include at least one of 1) a motion vector, 2) the index of a reference image, and 3) a prediction direction. The prediction direction may be unidirectional or bidirectional information.

At this time, merging may be applied on a CU basis or a PU basis. When merging is performed on a CU basis or a PU basis, the encoding apparatus 100 may transmit predefined information to the decoding apparatus 200 through a bitstream. The bitstream may include predefined information. The predefined information may include 1) information indicating whether to perform merging for each block partition, and 2) information indicating with which block of neighboring blocks, adjacent to the current block, merging is to be performed. For example, the neighboring blocks around the current block may include a left block adjacent to the current block, an upper block adjacent to the current block, a block temporally adjacent to the current block, etc.

The merge candidate list may indicate a list in which pieces of motion information are stored. Further, the merge candidate list may be generated before merging is performed. The motion information stored in the merge candidate list may be 1) the motion information of neighboring blocks adjacent to the current block or 2) the motion information of the block corresponding to the current block (collocated block) in the reference image. Furthermore, the motion information stored in the merge candidate list may be new motion information, generated via a combination of pieces of motion information previously present in the merge candidate list.

The skip mode may be a mode in which the information of neighboring blocks is applied to the current block without change. The skip mode may be one of the modes used for inter-prediction. When the skip mode is used, the encoding apparatus 100 may transmit only information indicating the motion block, the motion information of which is to be used as the motion information of the current block, to the decoding apparatus 200 through a bitstream. The encoding apparatus 100 may not transmit additional information to the decoding apparatus 200. For example, the additional information may be syntax information. The syntax information may include information about a motion vector difference.

Figure 8:
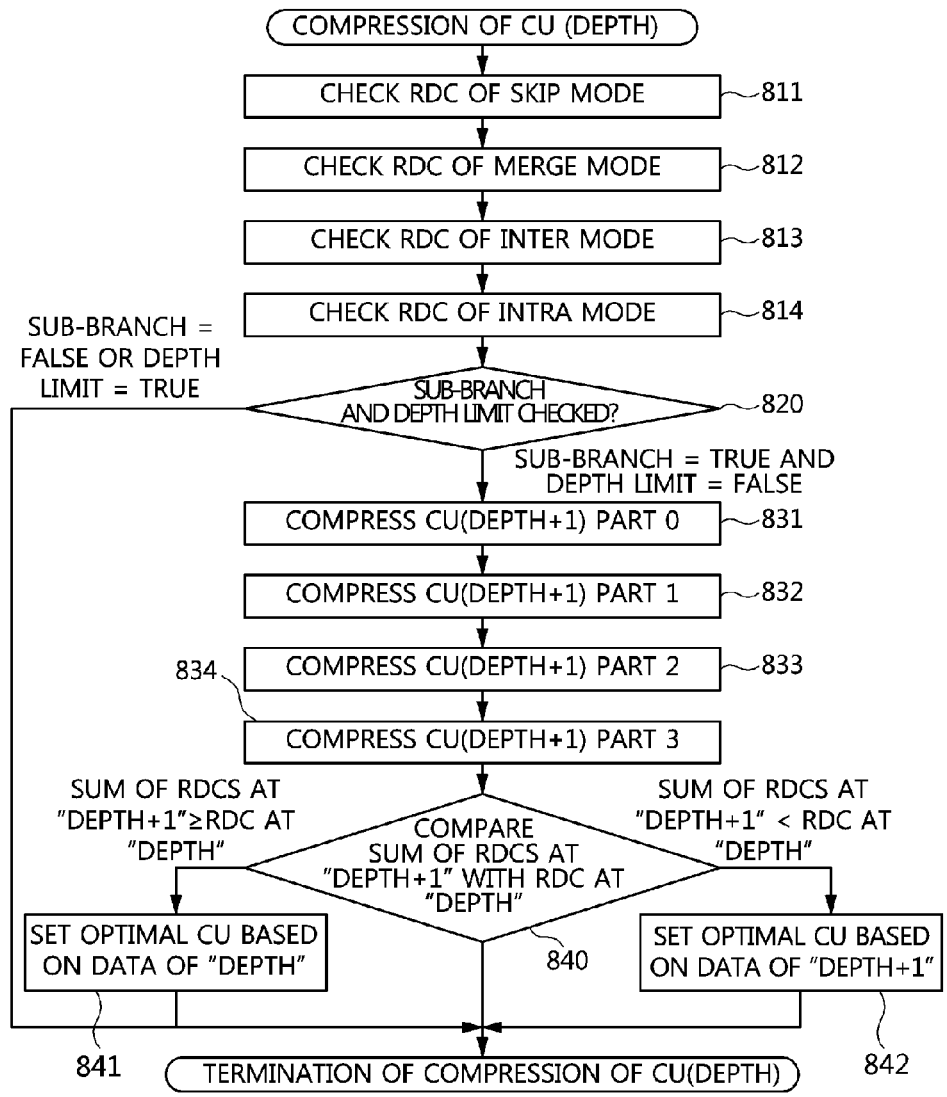
FIG. 8 is a flowchart showing the method by which the encoding apparatus determines the encoding mode of a CU.

FIG. 8 is a flowchart showing the method by which the encoding apparatus determines the encoding mode of a CU.

The compression of the CU may be performed at steps 811, 812, 813, 814, 820, 831, 832, 833, 834, 840, 841, and 842.

The term "depth" may denote the depth of the CU. The terms "compression" and "encoding" may be used to have the same meaning, and may be replaced with each other.

At step 811, the encoding apparatus 100 may check the Rate-Distortion Cost (RDC) of a skip mode for the CU.

At step 812, the encoding apparatus 100 may check the RDC of a merge mode for the CU.

At step 813, the encoding apparatus 100 may check the RDC of an inter mode for the CU.

At step 814, the encoding apparatus 100 may check the RDC of an intra mode for the CU.

At step 820, the encoding apparatus 100 may check a sub-branch and a depth limit.

For example, when the value of a sub-branch is false, or when the value of a depth limit is true, the compression of the CU may be terminated. In other words, when the CU does not have a sub-branch, or when the CU has already reached a depth limit, the compression of the CU may be terminated. When the value of the sub-branch is true and the value of the depth limit is false, step 831 may be performed. In other words, when the CU has a sub-branch but has not yet reached the depth limit, step 831 may be performed.

At step 831, the method for determining an encoding mode in the embodiment may be performed on part 0 of the CU. "CU (depth+1) part 0" may be compressed. In other words, the method for determining the encoding mode may be recursively performed on a part of the current CU. "(depth+1)" may mean that the depth of the CU, which is the target of encoding, is greater than the depth of the current CU by 1.

The encoding apparatus 100 may calculate the RDC of the part 0 of the CU.

At step 832, the method for determining the encoding mode according to the embodiment may be performed on part 1 of the CU. "CU (depth+1) part 1" may be compressed.

The encoding apparatus 100 may calculate the RDC of part 1 of the CU.

At step 833, the method for determining the encoding mode according to the embodiment may be performed on part 2 of the CU. "CU (depth+1) part 2" may be compressed.

The encoding apparatus 100 may calculate the RDC of part 2 of the CU.

At step 834, the method for determining the encoding mode according to the embodiment may be performed on part 3 of the CU. "CU (depth+1) part 3" may be compressed.

The encoding apparatus 100 may calculate the RDC of part 3 of the CU.

At step 840, the encoding apparatus 100 may compare the sum of RDCs at "depth+1" with the RDC at "depth". Here, the RDCs at "depth+1" may be the RDC at part 0 of the CU, the RDC at part 1 of the CU, the RDC at part 2 of the CU, and RDC at part 3 of the CU. The RDC at "depth" may be the RDC of the current CU. The RDC of the CU may be the lowest RDC among the RDC in the skip mode, the RDC in the merge mode, the RDC in the inter mode, and the RDC in the intra mode.

When the sum of RDCs at "depth+1" is less than the RDC at "depth", step 842 may be performed. When the sum of RDCs at "depth+1" is equal to or greater than RDC at "depth", step 841 may be performed.

At step 841, the encoding apparatus 100 may set an optimal CU based on the current depth data. The encoding apparatus 100 may check RDCs in the intra mode. The encoding apparatus 100 may set the sum of RDCs at "depth+1" as the RDC of the CU. Further, the encoding apparatus 100 may indicate that the CU is partitioned. The encoding apparatus 100 may check RDCs in the intra mode. The encoding apparatus 100 may indicate that the CU is not partitioned any further. Further, the RDC of the CU may be maintained without change.

At step 842, the encoding apparatus 100 may set an optimal CU using data about a depth that is greater than the current depth by 1. The encoding apparatus 100 may check RDCs in the intra mode. The encoding apparatus 100 may indicate that the CU is not partitioned any further. Further, the RDC of the CU may be maintained without change. The encoding apparatus 100 may set the sum of RDCs at "depth+1" as the RDC of the CU. Furthermore, the encoding apparatus 100 may indicate that the CU is partitioned.

When step 841 or 842 is performed, the compression of the CU may be terminated.

Figure 9:
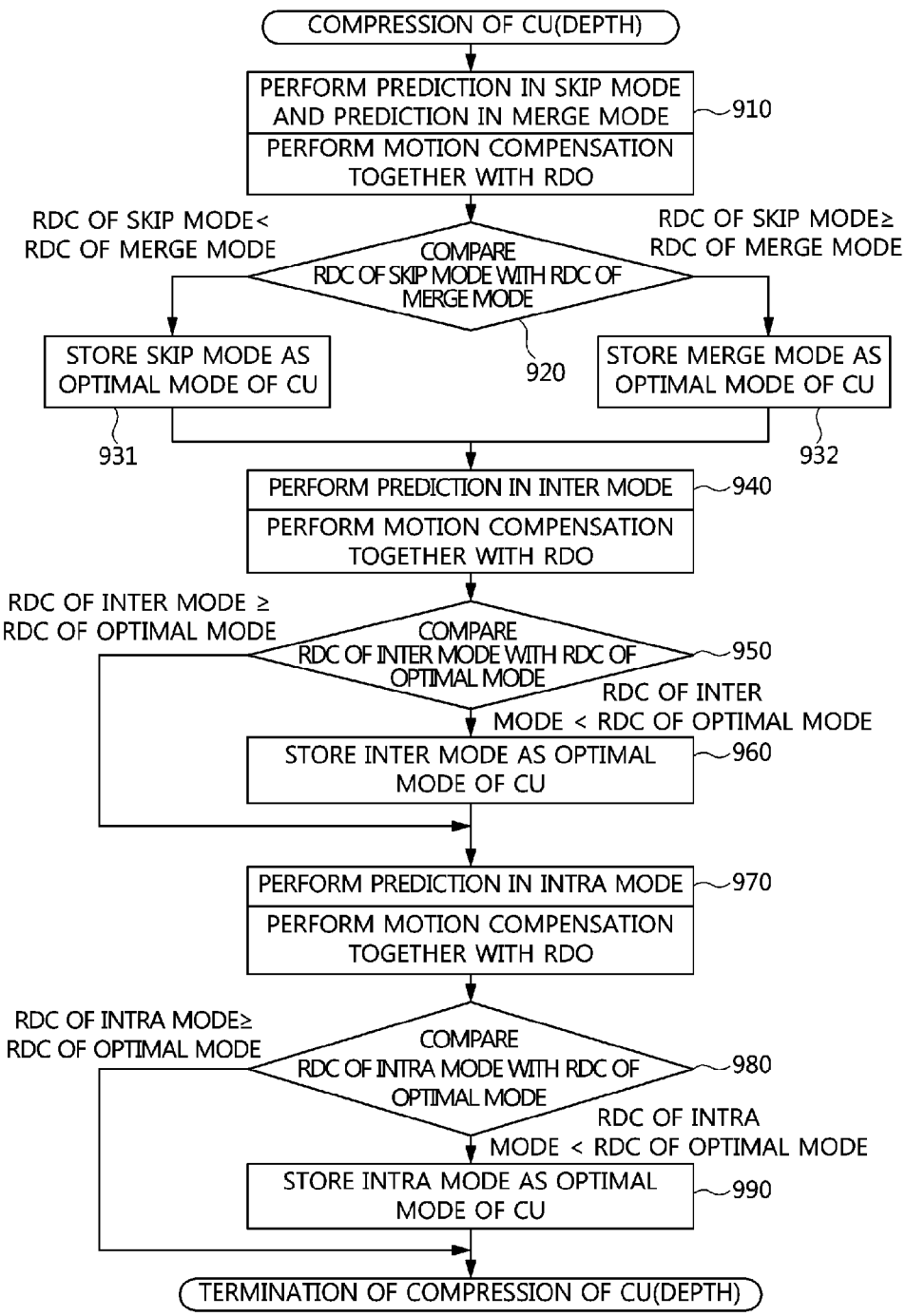
FIG. 9 is a flowchart showing the method by which the encoding apparatus determines an encoding mode according to an embodiment.

FIG. 9 is a flowchart showing the method by which the encoding apparatus determines an encoding mode according to an embodiment.

The encoding apparatus 100 may, for each of multiple modes, determine whether to use the mode to encode a block. To determine the mode to be used to encode a block among the multiple modes, the encoding apparatus 100 may calculate rate-distortion costs (RDCs) of the multiple modes, and may select the mode having the minimum rate-distortion cost from among multiple modes as the encoding mode to be used to encode the block.

The method for calculating the rate-distortion cost of each mode will be described below. First, the encoding apparatus 100 may generate a prediction block for an original block by performing prediction of the mode, and may perform a Discrete Cosine Transform (DCT) on a residual block, which is the difference between the prediction block and the original block. Next, the encoding apparatus 100 may generate an encoded block by applying Rate-Distortion Optimized Quantization (RDOQ) to the transformed residual block. The encoding apparatus 100 may generate a reconstructed block by applying inverse DCT and inverse quantization to the encoded block.

In embodiments, the terms "block", "image", and "signal" may be interchangeably used. For example, "original block" may have the same meaning as "original image" and "original signal", and "prediction block" may have the same meaning as "prediction image" and "prediction signal", and "residual block" may have the same meaning as "residual image" and "residual signal".

The rate-distortion cost of a mode may be a value obtained by adding 1) the function value of a predetermined function of inputting the difference between the reconstructed block and the original block to 2) the product (multiplication) of a mode description bit and a Lagrangian multiplier. The mode description bit may be a bit that indicates which encoding mode has been used to encode the corresponding block in the encoded block.

For example, the multiple modes may include a skip mode, a merge mode, an inter mode, and an intra mode. In the following description, the method for selecting an encoding mode for encoding the CU from among the four modes will be described below.

At step 910, the encoding apparatus 100 may perform prediction in a skip mode and prediction in a merge mode. The encoding apparatus 100 may perform motion compensation together with Rate-Distortion Optimization (RDO). The RDO may include Rate-Distortion Optimized Quantization (RDOQ).

The encoding apparatus 100 may calculate the RDC of the skip mode by performing prediction in the skip mode, and calculate the RDC of the merge mode by performing prediction in the merge mode.

At step 920, the encoding apparatus 100 may compare the RDC of the skip mode with the RDC of the merge mode. When the RDC of the skip mode is less than the RDC of the merge mode, step 931 may be performed. When the RDC of the skip mode is equal to or greater than the RDC of the merge mode, step 932 may be performed.

At step 931, the encoding apparatus 100 may store the skip mode as the optimal mode of the CU. Alternatively, the encoding apparatus 100 may set the skip mode as the optimal mode of the CU.

At step 932, the encoding apparatus 100 may store the merge mode as the optimal mode of the CU. Alternatively, the encoding apparatus 100 may set the merge mode as the optimal mode of the CU.

At step 940, the encoding apparatus 100 may perform prediction in the inter mode. The encoding apparatus 100 may perform motion compensation together with the RDO. The RDO may include RDOQ.

The encoding apparatus 100 may calculate the RDC of the inter mode by performing prediction in the inter mode.

At step 950, the encoding apparatus 100 may compare the RDC of the inter mode with the RDC of the current optimal mode. When the RDC of the inter mode is less than the RDC of the optimal mode, step 960 may be performed. When the RDC of the inter mode is equal to or greater than the RDC of the optimal mode, step 970 may be performed.

At step 960, the encoding apparatus 100 may store the inter mode as the optimal mode of the CU. Alternatively, the encoding apparatus 100 may set the inter mode as the optimal mode of the CU. In other words, the optimal mode of the CU may be changed to the inter mode.

At step 970, the encoding apparatus 100 may perform prediction in the intra mode. The encoding apparatus 100 may perform motion compensation together with the RDO. The RDO may include RDOQ.

The encoding apparatus 100 may calculate the RDC of the intra mode by performing prediction in the intra mode.

At step 980, the encoding apparatus 100 may compare the RDC of the intra mode with the RDC of the current optimal mode. When the RDC of the intra mode is less than the RDC of the optimal mode, step 990 may be performed. When the RDC of the intra mode is equal to or greater than the RDC of the optimal mode, the determination of the encoding mode may be terminated.

At step 990, the encoding apparatus 100 may store the intra mode as the optimal mode of the CU. Alternatively, the encoding apparatus 100 may set the intra mode as the optimal mode of the CU. In other words, the optimal mode of the CU may be changed to the intra mode.

The above-described method for determining the encoding mode must perform computation such as prediction, DCT, RDOQ, inverse DCT, and inverse quantization in each of the multiple modes. Depending on the application field, this computational load may become a principal factor that prevents the encoding apparatus 100 from supporting a required encoding speed. For example, the application field may include real-time encoding.

Figure 10:
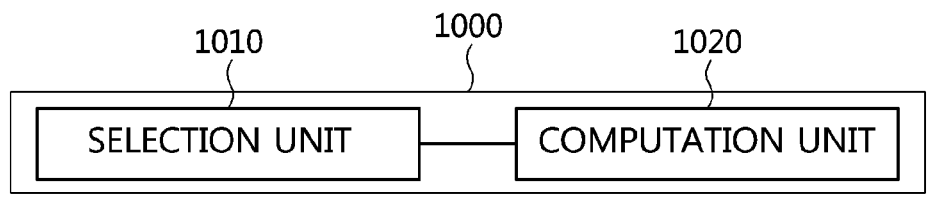
FIG. 10 is a configuration diagram of the encoding apparatus according to an embodiment.

FIG. 10 is a configuration diagram of the encoding apparatus according to an embodiment.

An encoding apparatus 1000 may correspond to the encoding apparatus 100 described above with reference to FIG. 1. Alternatively, the encoding apparatus 1000 may be a part of the encoding apparatus 100.

The encoding apparatus 1000 may include a selection unit 1010 and a computation unit 1020. Alternatively, the encoding apparatus 1000 may further include a motion prediction unit 111, a motion compensation unit 112, an intra-prediction unit 120, a switch 115, a subtractor 125, a transform unit 130, a quantization unit 140, an entropy encoding unit 150, an inverse quantization unit 160, an inverse transform unit 170, an adder 175, a filter unit 180, and a reference picture buffer 190, as shown in FIG. 1.

The selection unit 1010 may correspond to at least some components related to the function or operation of the selection unit 1010, which will be described later, among the components of the encoding apparatus 100 that have been described above with reference to FIG. 1. For example, the selection unit 1010 may include at least some of the motion compensation unit 111, the motion compensation unit 112, and the intra-prediction unit 120.

The computation unit 1020 may correspond to at least some components related to the function or operation of the computation unit 1020, which will be described later, among the components of the encoding apparatus 100 that have been described above with reference to FIG. 1. For example, the computation unit 1020 may include at least some of the transform unit 130, the quantization unit 140, the entropy encoding unit 150, the inverse quantization unit 160, and the inverse transform unit 170.

The selection unit 1010 may select an encoding mode to be used to encode a target block from among multiple modes. For example, the target block may be a CU.

The multiple modes may include a skip mode, a merge mode, an inter mode, and an intra mode.

In order to select the encoding mode to be used to encode a target block from among the multiple modes, predetermined criteria are required. The selection unit 1010 may use the costs of the modes to select the encoding mode to be used to encode a target block from among the multiple modes. The selection unit 1010 may calculate the cost of at least one mode among the multiple modes in relation to the encoding of the target block, and may select the encoding mode to be used to encode the target block from among the multiple modes based on the cost.

In the embodiment, the term "cost" may be used to have the same meaning as the term "indicator". Further, the term "cost" and the term "indicator" may be interchangeably used.

The cost calculated by the selection unit 1010 may be used to minimize a computational load of the above-described DCT and RDOQ. In other words, upon encoding the target block, the encoding apparatus 1000 may replace the existing rate-distortion cost with the cost calculated by the selection unit 1010, and then use the cost.

The cost calculated by the selection unit 1010 may be similar rate-distortion cost. For example, the cost of the corresponding mode may be similar rate-distortion cost, which is the value related to the rate-distortion cost when the mode is used to encode the target block. The similar rate-distortion cost is not identical to the actual rate-distortion cost, but may derive results that are similar to the results obtained when the rate-distortion cost is used, upon determining the encoding mode to be used to encode the target block.

The computation unit 1020 may perform computation of the RDO for the selected encoding mode.

Depending on the selection by the selection unit 1010, the computation of the RDO may be performed only in the mode selected as the encoding mode to be used to encode the target block, from among the multiple modes. For example, the computation unit 1020 may not perform the computation of the RDO in modes other than the mode selected as the encoding mode from among the multiple modes. Therefore, the computational load of the above-described DCT and RDOQ may be reduced or minimized.

The characteristics, functions, and operations of the selection unit 1010 and the computation unit 1020 will be described in detail below.

Figure 11:
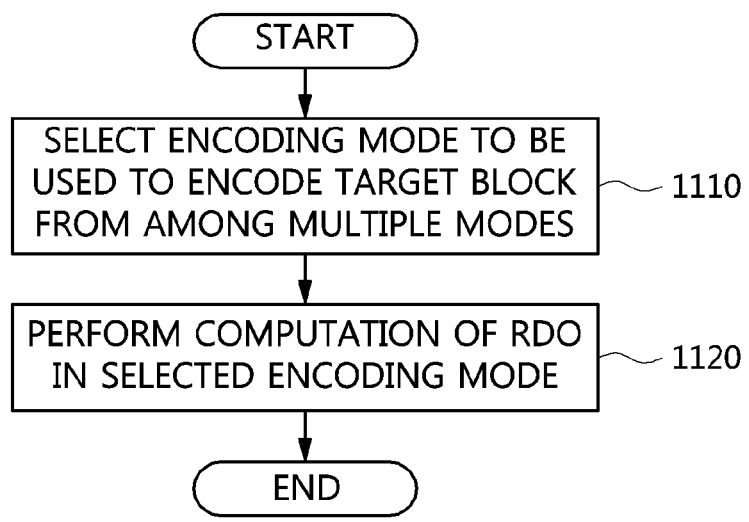
FIG. 11 is a schematic flowchart showing an encoding method according to an embodiment.

FIG. 11 is a schematic flowchart showing an encoding method according to an embodiment.

At step 1110, the selection unit 1010 may select an encoding mode to be used to encode a target block from among multiple modes. For example, the target block may be a CU.

The selection unit 1010 may calculate the cost of at least one of the multiple modes in relation to the encoding of the target block, and may select the encoding mode to be used to encode the target block based on the cost.

At step 1120, the computation unit 1020 may perform computation of the RDO in the selected encoding mode.

Further, the computation unit 1020 may perform encoding of the target block in the encoding mode selected based on the results of computation of the RDO.

Figure 12:
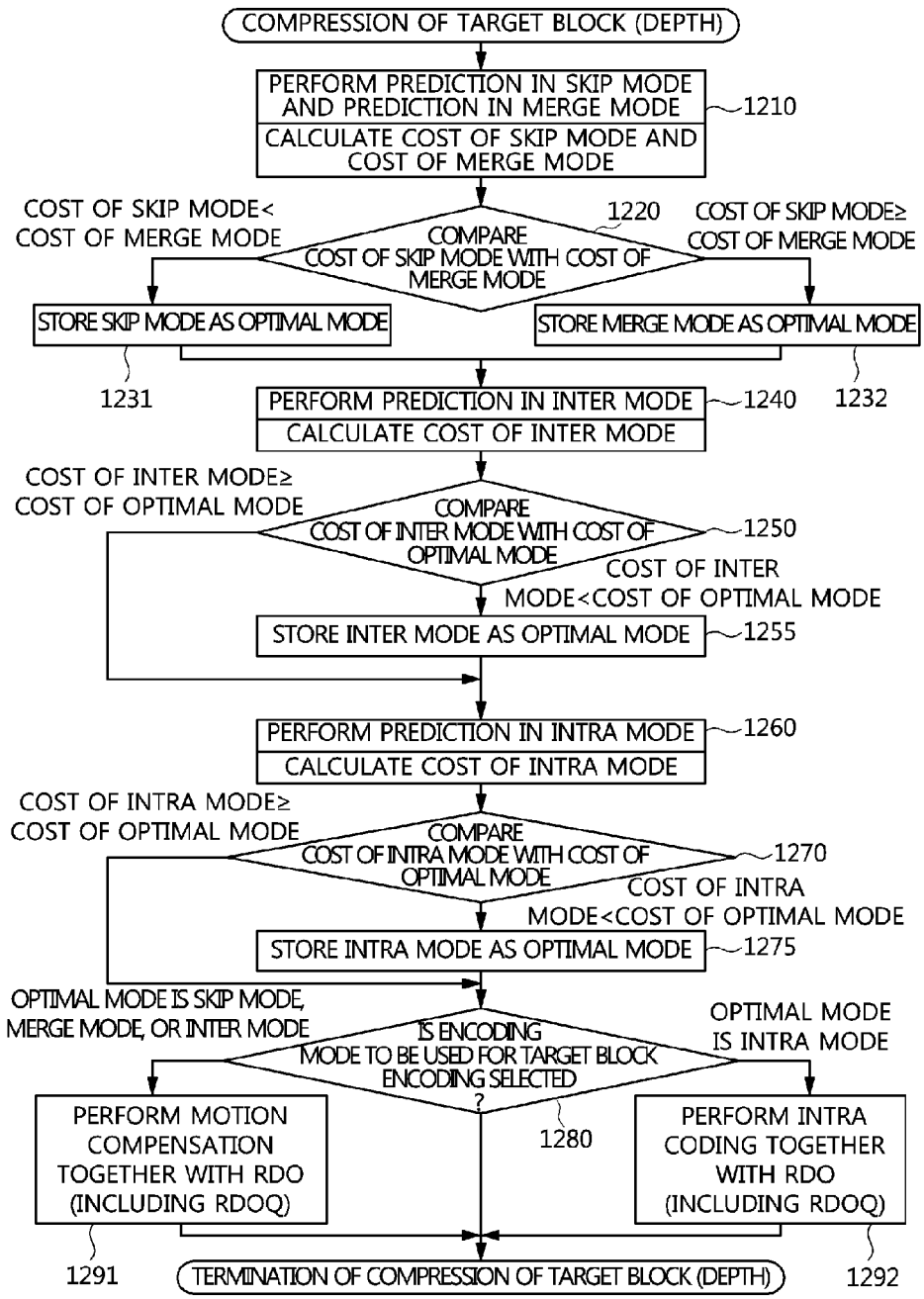
FIG. 12 is a flowchart showing an encoding method according to an embodiment.

FIG. 12 is a flowchart showing an encoding method according to an embodiment.

In the encoding method according to the embodiment, the selection unit 1010 may calculate the costs of multiple modes in relation to the encoding of a target block, and may select the mode having the minimum cost, among the calculated costs, as the encoding mode to be used to encode the target block.

In the following embodiment, at the mode prediction step, the similar rate-distortion cost of each mode may be calculated, and RDO may be performed in the mode having the minimum similar rate-distortion cost, among the multiple modes.

Step 1110, described above with reference to FIG. 11, may correspond to steps 1210, 1220, 1231, 1232, 1240, 1250, 1255, 1260, 1270, 1275, and 1280. Step 1120, described above with reference to FIG. 11, may correspond to steps 1291 and 1292.

At step 1210, the selection unit 1010 may perform prediction of the target block in a skip mode and prediction of the target block in a merge mode.

The selection unit 1010 may calculate the cost of the skip mode while performing prediction of the target block in the skip mode. The cost may be similar rate-distortion cost. Hereinafter, the cost may be the similar rate-distortion cost.

The selection unit 1010 may calculate the cost of the merge mode while performing prediction of the target block in the merge mode.

At step 1220, the selection unit 1010 may compare the cost of the skip mode with the cost of the merge mode.

When the cost of the skip mode is less than the cost of the merge mode, step 1231 may be performed. When the cost of the skip mode is equal to or greater than the cost of the merge mode, step 1232 may be performed.

At step 1231, the selection unit 1010 may store the skip mode as an optimal mode. Alternatively, the selection unit 1010 may set the skip mode as the optimal mode.

Here, the optimal mode may be the mode that is determined to be optimal for the encoding of the target block, among the multiple modes. Alternatively, the optimal mode may be the mode having the minimum cost among the multiple modes.

At step 1232, the selection unit 1010 may store the merge mode as the optimal mode. Alternatively, the selection unit 1010 may set the merge mode as the optimal mode.

At step 1240, the selection unit 1010 may perform prediction of the target block in the inter mode.

The selection unit 1010 may calculate the cost of the inter mode while performing prediction of the target block in the inter mode.

At step S1250, the selection unit 1010 may compare the cost of the inter mode with the cost of the current optimal mode.

When the cost of the inter mode is less than the cost of the current optimal mode, step 1255 may be performed. When the cost of the inter mode is equal to or greater than the cost of the current optimal mode, step 1260 may be performed.

At step 1255, the selection unit 1010 may store the inter mode as the optimal mode. Alternatively, the selection unit 1010 may set the inter mode as the optimal mode.

At step 1260, the selection unit 1010 may perform prediction of the target block in the intra mode.

The selection unit 1010 may calculate the cost of the intra mode while performing prediction of the target block in the intra mode.

At step 1270, the selection unit 1010 may compare the cost of the intra mode with the cost of the current optimal mode.

When the cost of the intra mode is less than the cost of the current optimal mode, step 1275 may be performed. When the cost of the intra mode is equal to or greater than the cost of the current optimal mode, step 1280 may be performed.

At step 1275, the selection unit 1010 may store the intra mode as the optimal mode. Alternatively, the selection unit 1010 may set the intra mode as the optimal mode.

At steps 1210, 1220, 1231, 1232, 1240, 1250, 1255, 1260, 1270, and 1275, the selection unit 1010 may calculate the costs of multiple modes in relation to the encoding the target block.

At step 1280, the selection unit 1010 may select the encoding mode to be used to encode the target block from among the multiple modes. The selection unit 1010 may select the mode having the minimum cost as the encoding mode, from among the multiple modes. In other words, the encoding mode to be used to encode the target block may be the mode having the minimum cost among the multiple modes.

The optimal mode determined at steps 1210, 1220, 1231, 1232, 1240, 1250, 1255, 1260, 1270, and 1275 may be the mode having the minimum cost among the multiple modes. The selection unit 1010 may select the optimal mode as the encoding mode to be used to encode the target block.

At step 1280, when a skip mode, a merge mode or an inter mode is selected as the encoding mode, step 1291 may be performed. When an intra mode is selected as the encoding mode, step 1292 may be performed. For example, when the optimal mode is the skip mode, merge mode or inter mode, step 1291 may be performed. When the optimal mode is the intra mode, step 1292 may be performed.

At step 1291, the computation unit 1020 may perform motion compensation together with RDO. The RDO may include RDOQ.

At step 1292, the computation unit 1020 may perform intra coding together with RDO. The RDO may include RDOQ.

When step 1291 or 1292 is performed, the encoding of the target block may be completed.

In the above-described embodiment, the selection unit 1010 may calculate the cost of each mode (e.g. similar rate-distortion cost) at the mode prediction step. Alternatively, the computation unit 1020 may perform RDO only in the mode having the minimum cost among the multiple modes. Unlike conventional technology, in which a minimum of three RDO calculations are required at each step, the above-described embodiment may encode the target block using only a single RDO calculation.

Below, a calculation method related to costs of modes will be described. The calculation that will be described below is part of the calculation of the mode costs, and may be performed by the selection unit 1010. Further, in the following description, an original block may mean a target block that is to be encoded.

Similar Rate-distortion Costs of Modes

Below, the costs of modes in the embodiment described above with reference to FIG. 12 will be described.

The selection unit 1010 may calculate the cost of each mode using the function $f_M(H,\overline{B})$. For example, the cost of the mode may be $f_M(H,\overline{B})$. $f_M(H,\overline{B})$ may be a similar rate-distortion function.

$f_M(H,\overline{B})$ may be defined by the following Equation (2):

$$f_M(H,\overline{B}) = \alpha_M H_M + \lambda \cdot \overline{B}_M \qquad (2)$$

where $\alpha_M$ may be a model parameter for the corresponding mode. Model parameters may differ from each other for respective multiple modes.

M denotes a mode. For M, the following Equation (3) may be established:

$$M \in \{Skip, Merge, Inter, Intra\} \qquad (3)$$

where M may denote one of a skip mode, a merge mode, an inter mode, and an intra mode.

$H_M$ may be a Hadamard value in the mode. The Hadamard values may differ from each other for respective multiple modes.

$H_M$ may be defined by the following Equation (4):

$$H_M = \sum_j^n \sum_i^n \sum_k^n \sum_m^n |x_{j,k} x_{m,i} a_{k,m}| \qquad (4)$$

where $x_{i,j}$ may be pixel vales at coordinates (i, j) in a residual block, which is the difference between an original block and a prediction block. The size of each of the original block, the prediction block, and the residual block may be n×n. The Hadamard value may be determined based on the original block and the prediction block. Alternatively, the Hadamard value may be calculated based on the original block and the prediction block for the original block. Here, the original block may be the target block that is to be encoded. Below, the terms "original block" and "target block" may be used to have the same meaning.

$\alpha_{k,m}$ may be the element of Hadamard transform matrix A. Matrix A may be defined by the following Equation (5):

$$A = [\alpha_{i,j}] \in R^{n \times n} \qquad (5)$$

$\lambda$ may be a Lagrangian multiplier used to calculate the rate-distortion cost. $\overline{B}_M$ may be an estimated value of the number of bits required for mode description. $\overline{B}_M$ may indicate an estimated value of the number of bits used to indicate the mode when the original block is encoded in the corresponding mode. $\overline{B}_M$ will be described in greater detail below.

As described above, the cost of the mode may be calculated based on 1) the model parameter for the mode, 2) the Hadamard value in the mode, 3) the Lagrangian multiplier, and 4) the number of bits generated in the mode. In greater detail, the cost of the mode may be the sum of a first value and a second value. The first value may be the product of 1) the model parameter for the mode and 2) the Hadamard value in the mode. The second value may be the product of 1) the Lagrangian multiplier and 2) the estimated value of the number of bits required for mode description.

Further, as described above in Equations (2) to (5), the cost of the mode may be calculated without using a reconstructed block for the original block.

Rate-distortion Cost in Conventional HEVC Encoding

In conventional HEVC encoding, rate-distortion cost may be defined by the following Equation (6):

$$f_M(D,B) = D + \lambda B_M \qquad (6)$$

where D may be a value indicating the size of a residual block. The residual block may be the difference between the original block and the reconstructed block. D may be the square root of the sum of the squares of pixel values in the residual block. D may be defined by the following Equation (7).

$B_M$ denotes the number of bits required for mode description.

$$D = \sqrt{\sum_j \sum_i x_{j,i}^2} \qquad (7)$$

where $x_{i,j}$ denotes the values of a pixel having coordinates (j,i) in the residual block.

In the embodiment described above with reference to FIG. 12, the encoding apparatus 1000 performs only the prediction of a mode in order to determine the encoding mode, but does not perform a motion compensation procedure including steps for DCT, quantization, inverse quantization, and inverse DCT. Therefore, in the above embodiment described with reference to FIG. 12, the rate-distortion cost in the above-described Equation (6) cannot be used.

Therefore, a residual signal function, which is approximate to D, indicating the difference between the original block and the reconstructed block, or which is otherwise meaningful, is required. In the above-described $f_M(H,\overline{B})$, the first value $\alpha_M \cdot M$ may be a value that replaces D, indicating the difference between the original block and the reconstructed block for the original block.

Estimated Value of the Number of Bits Required for Mode Description

In the embodiment described above with reference to FIG. 12, the encoding apparatus 1000 performs only prediction in a mode so as to determine the encoding mode, but does not perform DCT transform or quantization of the residual block. Since DCT transform and quantization of the residual block are not performed, actual encoding bits are not generated in the embodiment described above with reference to FIG. 12. Here, the encoding bits may be bits required to describe the mode used as the encoding mode of the original block. Therefore, in the embodiment described above with reference to FIG. 12, the cost of the mode must be determined either in consideration of the number of encoding bits or based on a value approximate to the number of encoding bits.

In the above Equation (1), $\overline{B}_M$ may be an estimated value of the number of bits required to describe the mode, and may be a value corresponding to the number of encoding bits. Below, a method for calculating $\overline{B}_M$ will be described.

When the size of the original block is N×N, a quantization level may be required so as to calculate the approximate number of bits for the difference between the original block and the prediction block on the assumption that the size of a transform matrix is identical to that of the original block.

First, for the Hadamard value in Equation (4), a luma (luminance) level $L_Y(H_M)$ may be calculated using the following Equation (8):

$$L_Y(H_M)=(H_M^Y \cdot Q_s(Q_p\%6)) \cdot 2^{-(14+Q_p/6+\log_2 N)} \quad (8)$$

where $Q_s(\cdot)$ may be a scale value for the remainder obtained when dividing a quantization coefficient by 6. $Q_p$ may be the quantization coefficient.

$Q_s(\cdot)$ may be defined using the following Equation (9):

$$Q_s(k)=\{26214, 23302, 20560, 18396, 16384, 14564\} \forall k \in [0,6) \subset Z \quad (9)$$

$H_M^Y$ may be a Hadamard value for a luma component in the difference between the prediction block and the original block.

Next, for the Hadamard value given in Equation (4), a chrominance (chroma) level $L_{Cx}(H_M)$ may be calculated using the following Equation (10):

$$L_{Cx}(H_M)=(H_M^{Cx} \cdot Q_s(Q_p\%6)) \cdot 2^{-(13+Q_p/6+\log_2 N)} \quad (10)$$

where $C_x$ may denote Cb or Cr. In other words, $C_x$ may be represented by the following Equation (11):

$$C_x \in \{Cb, Cr\} \quad (11)$$

$H_M^C$ may be a Hadamard value for a chroma component in the difference between the prediction block and the original block.

By using the level of the luma component, calculated using Equation (8), and the level of the chroma component, calculated using Equation (10), a weighted average level $\overline{L}(H_M)$ may be calculated using the following Equation (12):

$$\overline{L}(H_M)=(7 \cdot L_Y(H_M^Y)+L_{Cb}(H_M^{Cb})+L_{Cr}(H_M^{Cr})) \cdot 2^{-3} \quad (12)$$

For the weighted average level $\overline{L}(H_M)$, $\overline{B}_M$, which is the estimated value of the number of bits required for the description of the mode, may be calculated using the quadratic function shown in the following Equation (13):

$$\overline{B}_M = L^2(H_M) + \frac{1}{2}L(H_M) + B_h \quad (13)$$

where $B_h$ may be the number of bits required for the description of the mode.

$$L^2(H_M) + \frac{1}{2}L(H_M)$$

may be the estimated number of bits for the residual signal.

As shown in Equation (13), $\overline{B}_M$ may be the sum of the estimated number of bits for the residual signal and the number of bits $B_h$ required for the description of the mode.

Derivation of Difference Between Reconstructed Block and Original Block

D, which is the difference between the reconstructed image and the original image, described above in Equation (5), may be derived based on a Hadamard transform value for the difference between a prediction image and the reconstructed image. D may be defined by the following Equation (14). By the following Equation (14), D may be derived based on a Hadamard transformed value for the difference between the prediction image and the reconstructed image.

$$\alpha_M H_M = \alpha_M(H_M^Y + H_M^{Cb} + H_M^{Cr}) \quad (14)$$

The value of $\alpha_M$ may be determined according to the Least Squares Method (LSM). According to LSM, the value of $\alpha_M$ may be set to 2.37.

$\alpha_M H_M$ may be a value corresponding to D.

$\alpha_M H_M$ may be calculated using $\alpha$, $\beta$, and $\gamma$. $\alpha$ and $\beta$ may be model parameters used for rate-control. $\gamma$ may be a correction coefficient for the quantization coefficient. The value of $\gamma$ may be 1.5. $\alpha_M H_M$ may be calculated using the following Equation (15):

$$\alpha_M H_M = \alpha(\overline{H}_M \cdot Q p^\gamma)^\beta \quad (15)$$

where $\overline{H}_M$ may be calculated using the following Equation (16):

$$\overline{H}_M=(7 \cdot H_M^Y+H_M^{Cb}+H_M^{Cr}) \cdot 2^{-3} \quad (16)$$

The function of the similar rate-distortion cost calculated using the above-described method may be used to calculate the cost of the mode.

Figure 13:
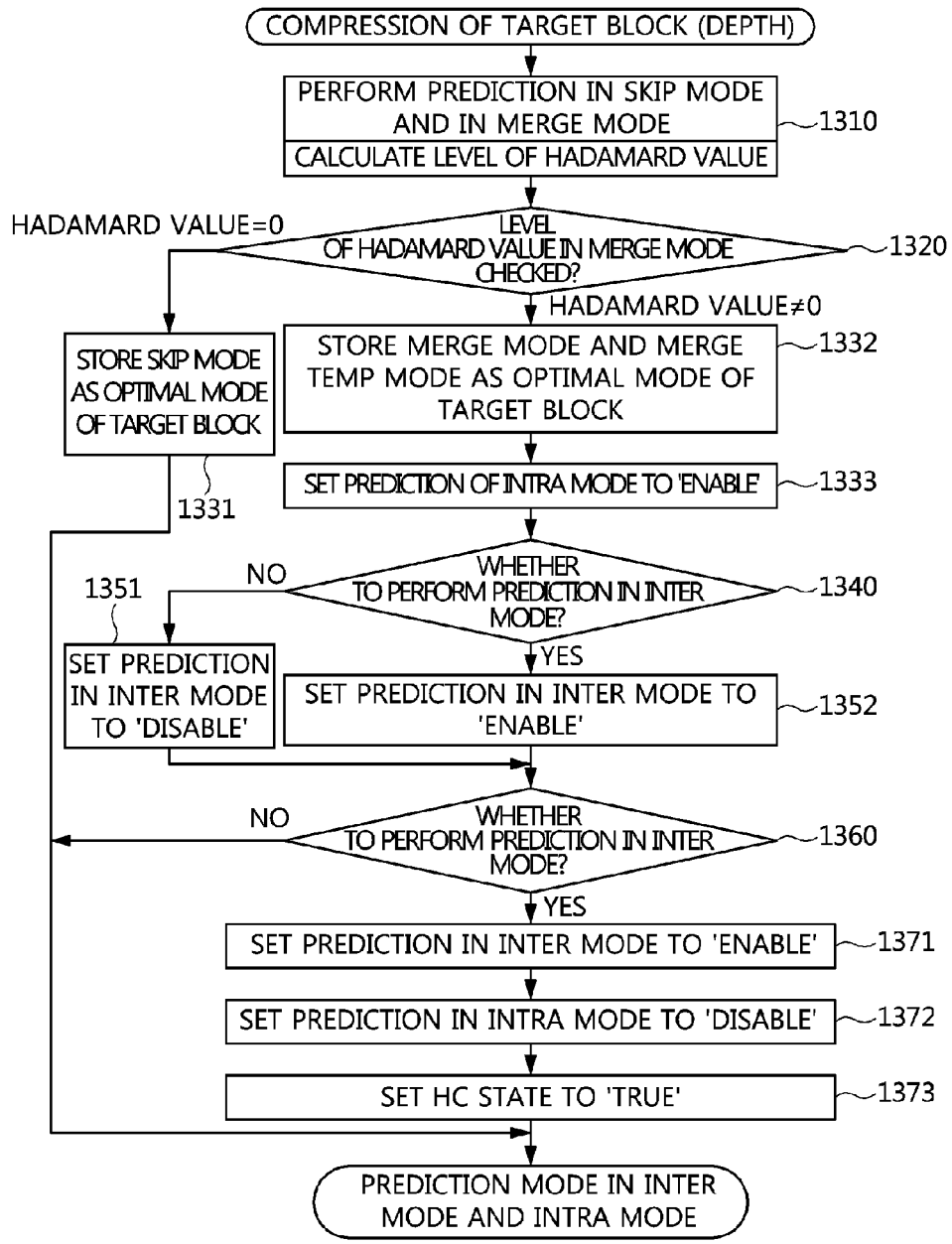
FIG. 13 is a flowchart showing a method for determining a skip mode and a merge mode according to an embodiment.

FIG. 13 is a flowchart showing a method for determining a skip mode and a merge mode according to an embodiment.

Steps which will be described with reference to FIG. 13 (steps 1310, 1320, 1331, 1332, 1333, 1340, 1351, 1352, 1360, 1371, 1372, and 1373) may correspond to the steps (1210, 1220, 1231, and 1232) described above with reference to FIG. 12. For example, after steps 1310, 1320, 1331, 1332, 1333, 1340, 1351, 1352, 1360, 1371, 1372, and 1373 have been performed, step 1240 of FIG. 12 may be performed.

At step 1310, the selection unit 1010 may perform prediction in a skip mode and a merge mode.

The selection unit 1010 may generate a prediction block for a target block based on the predicted motion vector of the target block. For such a prediction block, the skip mode may be a mode in which a bit is not generated by the residual block. In accordance with the above-described Equations (8) and (10), the optimal mode of the target block may be determined from the skip mode and the merge mode.

The selection unit 1010 may calculate the level $L(H_M)$ of a Hadamard value. The Hadamard value may be a Hadamard value in mode M.

At step 1320, the selection unit 1010 may check the level $L(H_M)$ of the Hadamard value in the merge mode.

When the value of $L(H_M)$ is 0, step 1331 may be performed. When the value of $L(H_M)$ is not 0, step 1332 may be performed.

At step 1331, the selection unit 1010 may store the skip mode as the optimal mode of the target block. Alternatively, the selection unit 1010 may set the skip mode as the optimal mode of the target block.

When the skip mode is set as the optimal mode of the target block, prediction in an inter mode and an intra mode (e.g. step 1240) may be performed. Alternatively, when the skip mode is set as the optimal mode of the target block, encoding of the target block at the current depth may be stopped.

At step 1332, the selection unit 1010 may store a merge mode and a merge temporary (temp) mode as the optimal mode of the target block. Alternatively, the selection unit 1010 may set the merge mode and the merge temp mode as the optimal mode of the target block.

At steps 1320, 1331 and 1332, the selection unit 1010 may determine the optimal mode of the target block (from the skip mode and the merge mode) using level $L(H_M)$. The selection unit 1010 may determine the optimal mode of the target block using the following Equation (17):

$$M = \begin{cases} \text{Skip} & L(H_M) = 0 \\ \text{Merge} & L(H_M) > 0 \end{cases} \quad (17)$$

where M may denote the optimal mode of the target block.

At steps 1310, 1320, 1331, and 1332, the selection unit 1010 may determine whether the encoding mode of the target block is a skip mode, using only 1) the prediction block in the merge mode and 2) the target block. When the level of the Hadamard value in the merge mode is 0, the selection unit 1010 may determine the encoding mode of the target block to be the skip mode.

In order to more promptly determine the encoding mode, the assumption that the values of levels in the corresponding mode are typically generated within a predetermined area may be made. Here, each level in a mode may mean the level of a Hadamard value in that mode. When the values of the levels in the mode are typically generated within a predetermined area, the range of level values in the mode may be given. When the value of a level in the mode is equal to or greater than a predefined value, the selection unit 1010 may perform motion compensation at a depth subsequent to the current depth, without performing motion compensation at the current depth of the target block.

At step 1333, the selection unit 1010 may set prediction in the intra mode to 'enable'. At prediction steps in the current skip mode and merge mode, the selection unit 1010 may not immediately enter prediction in the intra mode. Therefore, the selection unit 1010 may set the mode so that prediction in the intra mode may always be performed.

At step 1340, the selection unit 1010 may determine whether to perform prediction in the inter mode.

The selection unit 1010 may determine whether to perform prediction in the inter mode upon encoding the target block, based on both the level of the Hadamard value in the inter mode and a first threshold function.

The first threshold function may be represented by the following Equation (18):

$$\tau(M_p, S, Dp)|_{M_p=Inter} \quad (18)$$

where S may denote the depth of a slice in a Group Of Pictures (GOP). Dp may denote the depth of the target block. $M_p$ may denote a prediction mode. In Equation (18), $M_p$ indicates that the prediction mode is the inter mode.

The first threshold function $\tau(M_p, S, Dp)|_{M_p=Inter}$ may be defined by the following Equation (19) when the degree of S is $S_n$ and the degree of Dp is $Dp_n$:

$$\tau(M_p, S, Dp)|_{M_p=Inter} \in R^{S_n \times Dp_n} \quad (19)$$

According to the definition in Equation (19), $\tau(M_p, S, Dp)|_{M_p=Inter}$ may have the values given in the following Equation (20):

$$\tau(M_p, S, Dp)|_{M_p=Inter} = \begin{pmatrix} 13 & 13 & 9 & 9 \\ 15 & 15 & 15 & 6 \\ 21 & 21 & 21 & 21 \\ 21 & 21 & 19 & 19 \end{pmatrix} \quad (20)$$

Whether to perform prediction in the inter mode may be determined based on the following Equation (21):

$$\text{Inter Prediction} = \begin{cases} \text{true} & 0 < L(H_M) \le \tau(M_p, S, Dp)|_{M_p=Inter} \text{ or} \\ & (L(H_M) > \tau(M_p, S, Dp)|_{M_p=Inter} \text{ and} \\ & \overline{H}_M > |N \times N|) \\ \text{false} & \text{Otherwise} \end{cases} \quad (21)$$

When the result of Equation (21) is true, the selection unit 1010 may determine to perform prediction in the inter mode. When the result of Equation (21) is false, the selection unit 1010 may determine not to perform prediction in the inter mode.

For example, the selection unit 1010 may determine to perform prediction in the inter mode 1) when $L(H_M)$ is greater than 0, and is less than or equal to $\tau(M_p, S, Dp)|_{M_p=Inter}$, and 2) when $L(H_M)$ is greater than $\tau(M_p, S, Dp)|_{M_p=Inter}$ and $\overline{H}_M$ is greater than $|N \times N|$. In the remaining cases, the selection unit may determine not to perform prediction in the inter mode.

As described above, the selection unit 1010 may determine whether to perform prediction in the inter mode at the merge prediction step. Further, the selection unit 1010 may determine whether to perform prediction in the inter mode using 1) the prediction block in the merge mode and 2) the target block. Here, the prediction block and the target block may be blocks in the skip mode and the merge mode.

When it is not determined to perform prediction in the inter mode, step 1351 may be performed. In contrast, when it is determined to perform prediction in the inter mode, step 1352 may be performed.

At step 1351, the selection unit 1010 may set prediction in the inter mode to 'disable'.

At step 1352, the selection unit 1010 may set prediction in the inter mode to 'enable'.

When the value of $L(H_M)$ is excessively large, prediction must be actually performed at a depth subsequent to the current depth of the target block, rather than the current depth. Hereinafter, the state in which $L(H_M)$ has a value that causes prediction to be performed at the subsequent depth of the target block may be referred to as a 'High Cost (HC) state'. At the step of prediction in the skip mode and the merge mode according to the present embodiment, the selection unit 1010 may omit prediction of the target block in the intra mode and perform only prediction of the target block in the inter mode when the $L(H_M)$ is in the HC state. Thereafter, as will be described later with reference to FIGS. 14A to 14C, the selection unit 1010 may determine whether to perform prediction in the intra mode depending on the results of prediction in the inter mode.

Below, a method for processing in the HC state will be described.

At step 1360, the selection unit 1010 may determine whether to perform prediction in an inter mode. For example, the selection unit 1010 may determine whether $L(H_M)$ is in the HC state. For example, when $L(H_M)$ is in the HC state, the selection unit 1010 may determine whether to omit prediction of the target block in the intra mode and to perform only prediction of the target block in the inter mode.

The selection unit 1010 may determine whether to omit prediction of the target block in the intra mode and perform only prediction in the inter mode when encoding the target block, based on both the level of a Hadamard value in the inter mode and a second threshold function.

The second threshold function may be represented by the following Equation (22):

$$\eta(M_p, S, Dp)|_{M_p=Inter} \quad (22)$$

In the second threshold function, when the value of S is 0 or 3, the value of the second threshold function may be 0, and even when the value of Dp is 0 or 3, the value of the second threshold function may be 0. The selection unit 1010 may set the second threshold function such that, when the value of S is 0 or 3 or when the value of Dp is 0 or 3, the second threshold function is 0, thus preventing the HC state from occurring due to the values of S and Dp.

The second threshold function may have the values given in the following Equation (23):

$$\eta(M_p, S, Dp)|_{Mp=Inter} = \begin{pmatrix} 0 & 0 & 0 & 0 \\ 0 & 11 & 24 & 0 \\ 0 & 20 & 28 & 0 \\ 0 & 0 & 0 & 0 \end{pmatrix} \quad (23)$$

The selection unit 1010 may determine whether to omit prediction in the intra mode and to perform prediction in the inter mode, based on the following Equation (24):

$$\text{Inter Prediction} = \begin{cases} \text{true} & L(H_M) \geq \eta(M_p, S, Dp)|_{Mp=Inter} \text{ and} \\ & \eta(M_p, S, Dp)|_{Mp=Inter} > 0 \\ \text{false} & L(H_M) < \eta(M_p, S, Dp)|_{Mp=Inter} \text{ or} \\ & \eta(M_p, S, Dp)|_{Mp=Inter} = 0 \end{cases} \quad (24)$$

When the result of Equation (24) is true, the selection unit 1010 may determine to omit prediction in the intra mode and to perform prediction in the inter mode. When the result of Equation 24 is false, the selection unit 1010 may maintain its previous determination without change.

For example, the selection unit 1010 may determine to omit prediction in the intra mode and to perform prediction in the inter mode 1) when $L(H_M)$ is equal to or greater than $\eta(M_p,S,Dp)|_{Mp=Inter}$, and 2) when $\eta(M_p,S,Dp)|_{Mp=Inter}$ is greater than 0. Further, the selection unit 1010 may maintain its previous determination without change 1) when $L(H_M)$ is less than $\eta(M_p,S,Dp)|_{Mp=Inter}$ or 2) when $\eta(M_p,S,Dp)_{Mp=Inter}$ is 0.

When the Hadamard value in the merge mode is in an HC state, the selection unit 1010 may determine whether to perform prediction in the inter mode using 1) the prediction block in the merge mode and 2) the target block. Here, the prediction block and the target block may be blocks in the skip mode and the merge mode.

When it is determined to omit prediction in the intra mode and to perform prediction in the inter mode, step 1371 may be performed. When it is not determined to omit prediction in the intra mode and to perform prediction in the inter mode, prediction in the intra mode and the inter mode (e.g. step 1240) may be performed.

At step 1371, the selection unit 1010 may set prediction in the inter mode to 'enable'.

At step 1372, the selection unit 1010 may set prediction in the intra mode to 'disable'.

At step 1373, the selection unit 1010 may set the state of HC to 'true'.

When step 1373 is performed, prediction in both the inter mode and the intra mode (e.g. step 1240) may be performed.

Via the above-described steps 1310, 1320, 1331, 1332, 1333, 1340, 1351, 1352, 1360, 1371, 1372 and 1373, the selection unit 1010 may determine whether to perform prediction in each of the skip mode, the merge mode, and the inter mode, based on 1) the prediction blocks in the skip mode and the merge mode and 2) the target block.

Figure 14A:
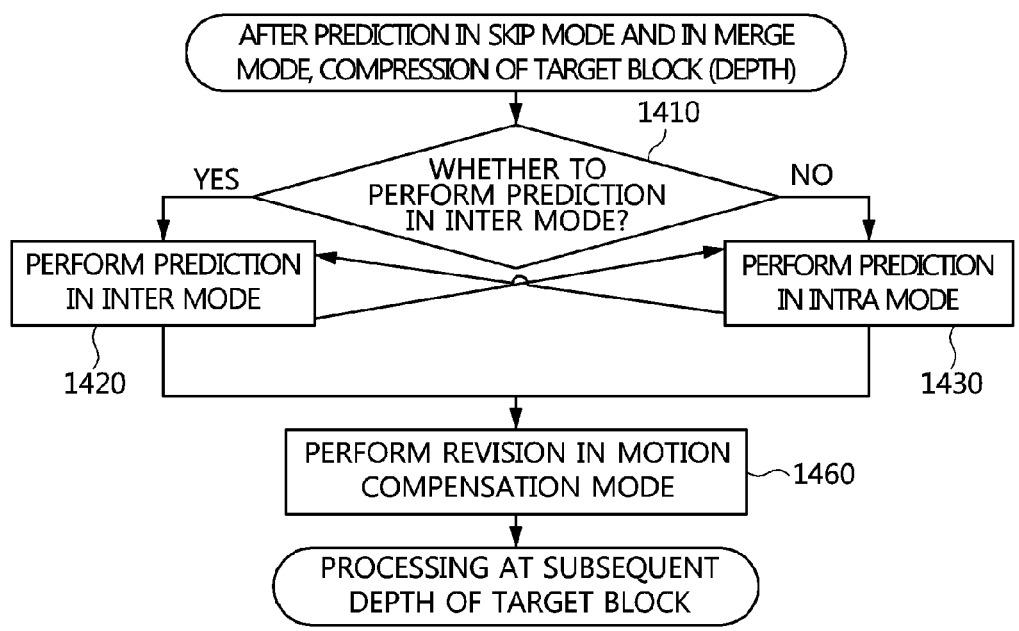
Figure 14B:
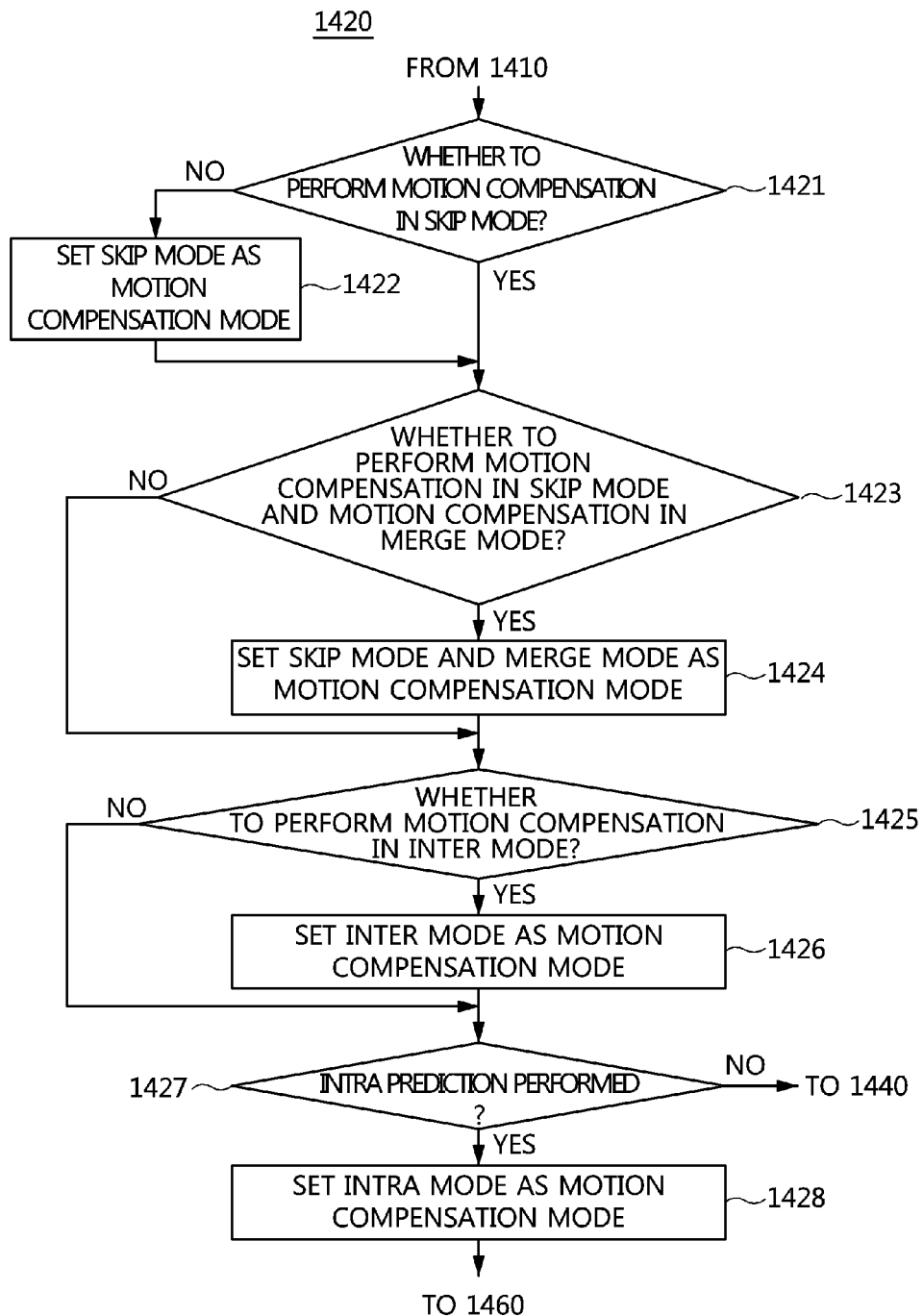
Figure 14C:
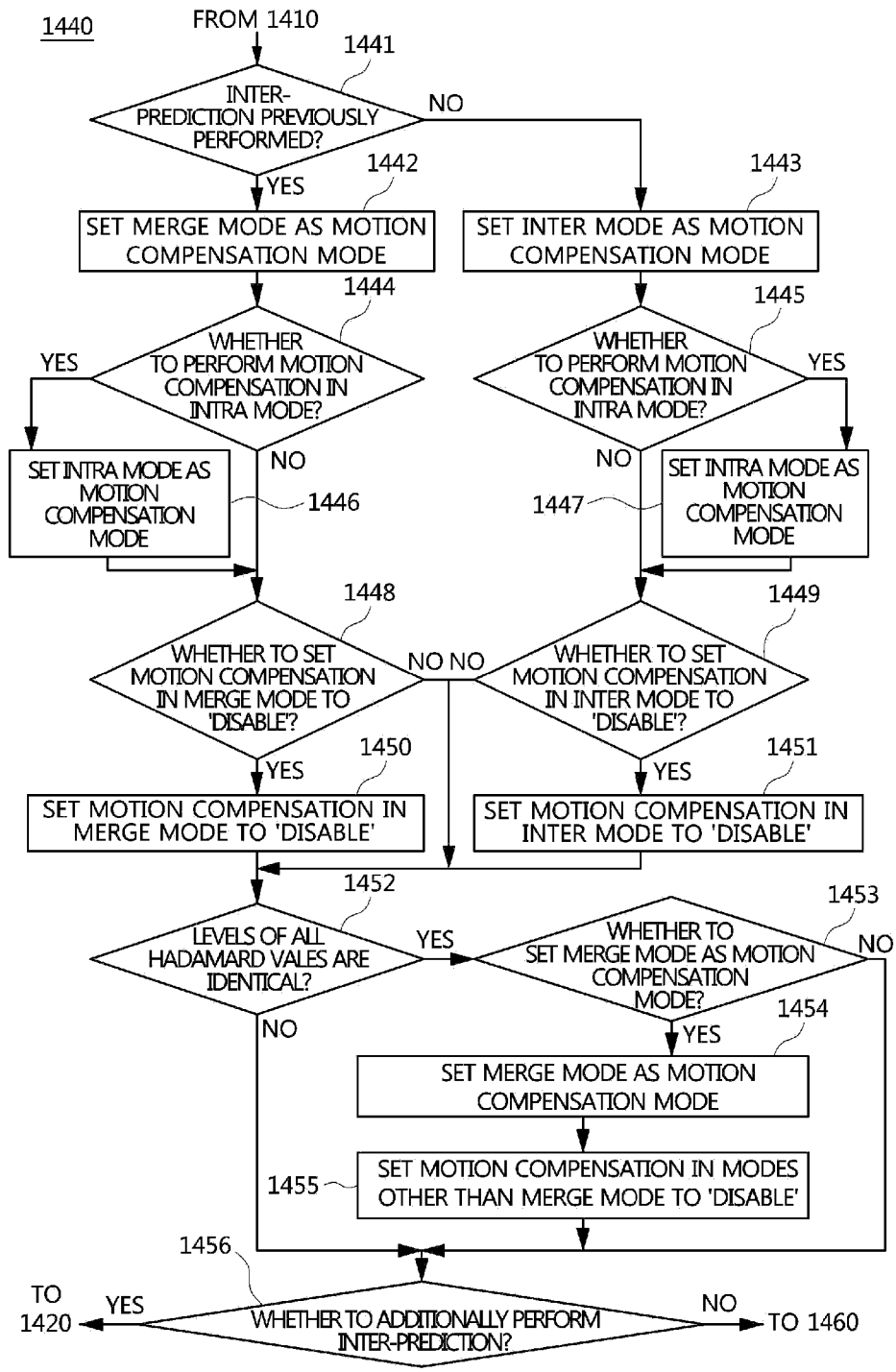

FIGS. 14A, 14B, and 14C are flowcharts showing methods for determining an inter mode and an intra mode according to embodiments.

FIG. 14A illustrates a method for determining an inter mode and an intra mode according to an embodiment.

FIG. 14B illustrates a method for determining an inter mode according to an embodiment.

FIG. 14C illustrates a method for determining an intra mode according to an embodiment.

First, a description will be made with reference to FIG. 14A.

At step 1410, the selection unit 1010 may determine whether to perform prediction in an inter mode.

Upon performing prediction in the inter mode and in the intra mode, the selection unit 1010 may basically and primarily perform prediction in the inter mode, and secondarily determine whether to perform prediction in the intra mode, based on the results of prediction in the inter mode. In contrast, if the selection unit 1010 determines not to perform prediction in the inter mode during the procedure (e.g. step 1351) for determining prediction in the skip mode and the merge mode, which has been described with reference to FIG. 13, the selection unit 1010 may primarily perform prediction in the intra mode and secondarily determine whether to perform prediction in the inter mode, based on the results of prediction in the intra mode.

When it is determined to perform prediction in the inter mode, step 1420 may be performed. When it is determined to perform prediction in the intra mode, step 1440 may be performed. Step 1420 may correspond to steps 1240, 1250, and 1255, which have been described above with reference to FIG. 12. Step 1440 may correspond to steps 1260, 1270, and 1275, which have been described above with reference to FIG. 12.

Prediction in the inter mode will be described with reference to FIG. 14B.

Step 1420 may include steps 1421, 1422, 1423, 1424, 1425, 1426, 1427, and 1428.

At step 1421, the selection unit 1010 may determine whether to discard inter-predicted values based on the result of comparison between Hadamard values, and to perform motion compensation in the skip mode. The Hadamard values may include Hadamard values in the skip mode and Hadamard values in the inter mode.

The selection unit 1010 may determine whether to discard inter-predicted values based on the following Equation (25), and to perform motion compensation in the skip mode.

$$\overline{H}_{M=Skip} > \overline{H}_{M=Inter} + 20 \cdot \sqrt{\lambda} \quad (25)$$

The selection unit 1010 may determine to perform motion compensation in the skip mode when the Hadamard value in the skip mode $\overline{H}_{M=Skip}$ is less than or equal to the sum of the Hadamard value in the inter mode $\overline{H}_{M=Inter}$ and $20 \cdot \sqrt{\lambda}$.

When it is determined to perform motion compensation in the skip mode, step 1422 may be performed. When it is not determined to perform motion compensation in the skip mode, step 1423 may be performed.

At step 1422, the selection unit 1010 may set the skip mode as a motion compensation mode. Alternatively, the selection unit 1010 may add the skip mode to the motion compensation mode.

At step 1423, the selection unit 1010 may determine whether to perform motion compensation in the skip mode and to perform motion compensation in the merge mode.

The selection unit 1010 may determine whether to perform motion compensation in the skip mode and to perform motion compensation in the merge mode, based on $L(M_p)|_{Mp=Skip/Merge}$ and $\tau(M_p,S,Dp)|_{Mp=Skip/Merge}$.

The selection unit 1010 may determine whether to perform compensation in the skip mode and to perform compensation in the merge mode, based on the following Equation (26):

$$\text{Skip/Merge}MC = \begin{cases} \text{true} & \tau(M_p, S, Dp)|_{Mp=Intra} < L(M_p) \leq \\ & \frac{1}{2}(\tau(M_p, S, Dp)|_{Mp=Intra} + \tau(M_p, S, Dp)|_{Mp=Inter}) \\ & \text{and } Dp < 3 \\ \text{false} & \text{otherwise} \end{cases} \quad (26)$$

When 'true' is derived in Equation (26), the selection unit 1010 may determine to perform motion compensation in the skip mode and to perform motion compensation in the merge mode.

Based on Equation (26), the selection unit 1010 may determine whether to perform motion compensation in the skip mode and in the merge mode, using 1) the prediction block in the inter mode and 2) the target block.

When it is determined to perform motion compensation in the skip mode and in the merge mode, step 1424 may be performed. When it is not determined to perform motion compensation in the skip mode and in the merge mode, step 1425 may be performed.

At step 1424, the selection unit 1010 may set the skip mode and the merge mode as the motion compensation mode. Alternatively, the selection unit 1010 may add the skip mode and the merge mode to the motion compensation mode.

At step 1425, the selection unit 1010 may determine whether to perform motion compensation in the inter mode.

When the state of HC is set at the step of performing prediction in the skip mode and the merge mode, the selection unit 1010 may determine whether to perform motion compensation in the inter mode, based on the value of $L(H_M)$, generated via inter-prediction. The selection unit 1010 may determine whether to perform motion compensation in the inter mode, based on the following Equation (27):

$$\text{Inter } MC = \begin{cases} \text{true} & L(H_M) < \vartheta(M_p, S, D) \\ \text{false} & \text{otherwise} \end{cases} \quad (27)$$

When the value of $L(H_M)$ is derived as "true" in Equation (27), the selection unit 1010 may determine to perform motion compensation in the inter mode.

$\vartheta(M_p, S, D)|_{Mp=Inte}$ may be defined by the following Equation (28):

$$\vartheta(M_p, S, D)|_{Mp=Inter} = \begin{pmatrix} 15 & 15 & 11 & 10 \\ 18 & 17 & 17 & 7 \\ 23 & 23 & 24 & 23 \\ 23 & 28 & 23 & 21 \end{pmatrix} \quad (28)$$

Based on Equation (28), the selection unit 1010 may determine whether to perform motion compensation in the inter mode using 1) the prediction block in the inter mode and 2) the target block.

When it is determined to perform motion compensation in the inter mode, step 1426 may be performed. When it is not determined to perform motion compensation in the inter mode, step 1427 may be performed.

At step 1426, the selection unit 1010 may set the inter mode as the motion compensation mode. Alternatively, the selection unit 1010 may add the inter mode to the motion compensation mode.

When step 1420, of prediction in the inter mode, is performed immediately after the step of prediction in the skip mode and in the merge mode has been performed, the mode has already been set such that motion compensation in the inter mode is performed, and thus it may be meaningless to perform steps 1425 and 1426. In contrast, after the step 1440 of prediction in the intra mode has been performed, it may be determined whether to perform motion compensation in the inter mode at steps 1425 and 1426.

At step 1427, the selection unit 1010 may examine whether prediction in the intra mode (intra-prediction) has been performed.

When intra-prediction has not yet been performed, step 1440 of performing intra-prediction may be performed. After intra-prediction has been performed, step 1428 may be performed.

At step 1428, the selection unit 1010 may set the intra mode as the motion compensation mode. Alternatively, the selection unit 1010 may add the intra mode to the motion compensation mode.

After step 1428 has been performed, step 1460, shown in FIG. 14A, may be performed.

Prediction in the intra mode will be described with reference to FIG. 14C.

Step 1440 may include steps 1441, 1442, 1443, 1444, 1445, 1446, 1447, 1448, 1449, 1450, 1451, 1452, 1453, 1454, 1455, and 1456.

At steps 1441, 1442, 1443, 1444, 1445, 1446, 1447, 1448, 1449, 1450, 1451, 1452, 1453, 1454, and 1455, the selection unit 1010 may determine which one of a merge mode, an inter mode, and an intra mode is to be selected as an optimal mode for intra-prediction, based on the above-described conditions, that is, the conditions of inter-prediction and the conditions of HC prediction. The selection unit 1010 may perform motion compensation in the mode selected as the optimal mode.

At step 1441, the selection unit 1010 may examine whether inter-prediction has been previously performed.

If inter-prediction has been previously performed, step 1442 may be performed. In contrast, when inter-prediction has not previously been performed, step 1443 may be performed.

At step 1442, the selection unit 1010 may set the merge mode as the motion compensation mode. Alternatively, the selection unit 1010 may add the merge mode to the motion compensation mode.

At step 1443, the selection unit 1010 may set the inter mode as the motion compensation mode. Alternatively, the selection unit 1010 may add the inter mode to the motion compensation mode.

When step 1442 is performed, step 1444 may be subsequently performed. When step 1443 is performed, step 1445 may be subsequently performed.

At step 1444, the selection unit 1010 may determine whether to perform motion compensation in the intra mode.

The selection unit 1010 may determine whether to perform motion compensation in the intra mode, based on the result of comparison between a Hadamard value in the merge mode $\overline{H}_{Merge}$ and a Hadamard value in the intra mode $\overline{H}_{Intra}$.

When merge prediction has been previously performed, the selection unit 1010 may determine whether to perform motion compensation in the intra mode, based on the following Equation (29):

$$\overline{H}_{Merge} < 0.61 \cdot \overline{H}_{Intra} \qquad (29)$$

When merge prediction has been previously performed, the selection unit 1010 may determine not to perform motion compensation in the intra mode when $\overline{H}_{Merge}$ is less than $0.61 \cdot \overline{H}_{Intra}$. When merge prediction has been previously performed, the selection unit 1010 may determine to perform motion compensation in the intra mode when $\overline{H}_{Merge}$ is equal to or greater than $0.61 \cdot \overline{H}_{Intra}$.

When it is determined to perform motion compensation in the intra mode, step 1446 may be performed. When it is not determined to perform motion compensation in the intra mode, step 1448 may be performed.

When it is not determined to perform motion compensation in the intra mode, the selection unit 1010 may perform inter-prediction after intra-prediction has been performed.

At step 1445, the selection unit 1010 may determine whether to perform motion compensation in the intra mode.

The selection unit 1010 may determine whether to perform motion compensation in the intra mode, based on the result of comparison between a Hadamard value in the inter mode $\overline{H}_{Inter}$ and a Hadamard value in the intra mode $\overline{H}_{Intra}$.

When inter-prediction has been previously performed, the selection unit 1010 may determine whether to perform motion compensation in the intra mode, based on the following Equation (30):

$$\overline{H}_{Inter} < 0.61 \cdot \overline{H}_{Intra} \qquad (30)$$

When inter-prediction has been previously performed, the selection unit 1010 may determine not to perform motion compensation in the intra mode when $\overline{H}_{Inter}$ is less than $0.61 \cdot \overline{H}_{Intra}$. When inter-prediction has been previously performed, the selection unit 1010 may determine to perform motion compensation in the intra mode when $\overline{H}_{Inter}$ is equal to or greater than $0.61 \cdot \overline{H}_{Intra}$.

When it is determined to perform motion compensation in the intra mode, step 1447 may be performed. When it is not determined to perform motion compensation in the intra mode, step 1448 may be performed.

At step 1446, the selection unit 1010 may set the intra mode as the motion compensation mode. Alternatively, the selection unit 1010 may add the intra mode to the motion compensation mode.

When step 1446 is performed, step 1448 may be subsequently performed.

At step 1447, the selection unit 1010 may set the intra mode as the motion compensation mode. Alternatively, the selection unit 1010 may add the intra mode to the motion compensation mode.

When step 1447 is performed, step 1449 may be subsequently performed.

At steps 1448, 1449, 1450, and 1451, the selection unit 1010 may determine whether to perform motion compensation in the intra mode without performing inter-prediction or motion compensation in the inter mode. When determining whether to perform motion compensation in the intra mode, the selection unit 1010 may use the Hadamard value in the merge mode $\overline{H}_{Merge}$ when inter-prediction is not performed, and may use the Hadamard value in the inter mode $\overline{H}_{Inter}$ when inter-prediction is performed.

At step 1448, the selection unit 1010 may determine whether to set motion compensation in the merge mode to 'disable'. When inter-prediction is not performed, the selection unit 1010 may determine whether to set motion compensation in the merge mode to 'disable', using the Hadamard value in the merge mode.

The selection unit 1010 may determine whether to set motion compensation in the merge mode to 'disable', based on the result of comparison between the Hadamard value in the merge mode $\overline{H}_{Merge}$ and the Hadamard value in the intra mode $\overline{H}_{Intra}$.

When inter-prediction has been previously performed, the selection unit 1010 may determine whether to set motion compensation in the merge mode to 'disable' based on the following Equation (31):

$$\overline{H}_{Merge} > 1.21 \overline{H}_{Intra} \qquad (31)$$

When inter-prediction has been previously performed, the selection unit 1010 may determine to set motion compensation in the merge mode to 'disable' when $\overline{H}_{Merge}$ is greater than $1.21 \overline{H}_{Intra}$. When inter-prediction has been previously performed, the selection unit 1010 may determine not to set motion compensation in the merge mode to 'disable' when $\overline{H}_{Merge}$ is less than or equal to $1.21 \overline{H}_{Intra}$.

When it is determined to set motion compensation in the merge mode to 'disable', step 1450 may be performed. When it is not determined to set motion compensation in the merge mode to 'disable', step 1452 may be performed.

At step 1449, the selection unit 1010 may determine whether to set motion compensation in the inter mode to 'disable'. When inter-prediction is performed, the selection unit 1010 may determine whether to set motion compensation in the inter mode to 'disable' using the Hadamard value in the inter mode.

The selection unit 1010 may determine whether to set motion compensation in the inter mode to 'disable', based on the result of comparison between the Hadamard value in the inter mode $\overline{H}_{Inter}$ and the Hadamard value in the intra mode $\overline{H}_{Intra}$.

When inter-prediction has not been previously performed, the selection unit 1010 may determine whether to set motion compensation in the inter mode to 'disable', based on the following Equation (32):

$$\overline{H}_{Inter} > 1.21 \overline{H}_{Intra} \qquad (32)$$

When inter-prediction has been previously performed, the selection unit 1010 may determine to set motion compensation in the inter mode to 'disable' when $\overline{H}_{Inter}$ is greater than $1.21 \overline{H}_{Intra}$. When inter-prediction has been previously performed, the selection unit 1010 may determine not to set motion compensation in the inter mode to 'disable' when $\overline{H}_{Inter}$ is less than or equal to $1.21 \overline{H}_{Intra}$.

When it is determined to set motion compensation in the inter mode to 'disable', step 1451 may be performed. When it is not determined to set motion compensation in the inter mode to 'disable', step 1452 may be performed.

At step 1450, the selection unit 1010 may set motion compensation in the merge mode to 'disable'. Alternatively, the selection unit 1010 may exclude the merge mode from the motion compensation mode.

When step 1450 is performed, step 1452 may be subsequently performed.

At step 1451, the selection unit 1010 may set motion compensation in the inter mode to 'disable'. Alternatively, the selection unit 1010 may exclude the inter mode from the motion compensation mode.

When step 1451 is performed, step 1452 may be subsequently performed.

As described above, the selection unit 1010 may determine whether to perform each of motion compensation in the merge mode, motion compensation in the inter mode, and motion compensation in the intra mode, at the intra-prediction step, based on Equations (29) to (32).

At steps 1452, 1453, 1454, and 1455, the selection unit 1010 may set the merge mode as the motion compensation mode and exclude the intra mode from the motion compensation mode when the levels of all Hadamard values are identical to each other and predetermined conditions are satisfied. When the levels of all Hadamard values are identical to each other and predetermined conditions are satisfied, the value of a similar rate-distortion function in the inter mode is greater than the value of a similar rate-distortion function in the merge mode, and thus the inter mode may be naturally excluded from the motion compensation mode.

At step 1452, the selection unit 1010 may examine whether the levels of all Hadamard values are identical to each other. All Hadamard values may include the Hadamard value in the inter mode, the Hadamard value in the intra mode, and the Hadamard value in the merge mode.

When the levels of all Hadamard values are identical to each other, step 1453 may be performed. In contrast, when not all the levels of Hadamard values are identical to each other, step 1456 may be performed.

At step 1453, when the levels of all Hadamard values are identical to each other, the selection unit 1010 may determine whether to set the merge mode as the motion compensation mode.

When the levels of all Hadamard values are identical to each other, the selection unit 1010 may determine whether to set the merge mode as the motion compensation mode, based on the following Equation (33):

$$\text{Intra } MC = \begin{cases} \text{true} & \overline{H}_{Intra} + 16.5 \cdot \lambda < \overline{H}_{Merge} \\ \text{false} & \overline{H}_{Intra} + 16.5 \cdot \lambda \geq \overline{H}_{Merge} \end{cases} \quad (33)$$

When 'true' is derived at Equation 33, the selection unit 1010 may determine to set the merge mode as the motion compensation mode. When 'false' is derived at Equation (33), the selection unit 1010 may not determine to set the merge mode as the motion compensation mode.

When $\overline{H}_{Intra}+16.5\cdot\lambda$ is less than $\overline{H}_{Merge}$, the selection unit 1010 may determine to set the merge mode as the motion compensation mode. When $\overline{H}_{Intra}+16.5\cdot\lambda$ is equal to or greater than $\overline{H}_{Merge}$, the selection unit 1010 may determine not to set the merge mode as the motion compensation mode.

As shown in Equation (33), when the levels of all Hadamard values in the multiple modes are identical to each other, the selection unit 1010 may determine the mode in which motion compensation is to be performed, among the multiple modes, using 1) the prediction block for the target block and 2) the target block.

When it is determined to set the merge mode as the motion compensation mode, step 1454 may be performed. When it is not determined to set the merge mode as the motion compensation mode, step 1456 may be performed.

At step 1454, the selection unit 1010 may set the merge mode as the motion compensation mode.

At step 1455, the selection unit 1010 may set motion compensation in modes other than the merge mode to 'disable'.

After steps 1454 and 1455 have been performed, step 1456 may be performed.

At step 1456, when inter-prediction has not yet been performed, the selection unit 1010 may determine whether to additionally perform inter-prediction. At step 1455, conditions required for additional inter-prediction may be derived.

When it is determined to additionally perform inter-prediction, step 1420 may be performed. When it is not determined to additionally perform inter-prediction, step 1460 may be performed.

Referring back to FIG. 14A, a description will be made below.

At step 1460, the selection unit 1010 may perform revision on the modes for motion compensation. The selection unit 1010 may select a mode for encoding a target block from among multiple modes so that mode compensation is performed only in a single mode.

By means of the above-described conditions, one or more of the multiple modes may be set to the motion compensation mode. Alternatively, by means of the above-described conditions, one or more of the multiple modes may be added to the motion compensation mode. The selection unit 1010 may select the mode to be used for motion compensation by using the costs of one or more modes set to the motion compensation mode.

The costs of modes may be defined based on the above-described Equations (13) and (14). For example, the costs of the modes may be defined by the following Equation (34):

$$h(H_M, B_M) = \alpha_M H_M + \overline{B}_M \quad (34)$$

When step 1460 is performed, processing on the target block at a subsequent depth may be performed.

The encoding apparatus 1000 according to an embodiment of the present invention may include the selection unit 1010 and the computation unit 1020. Further, the encoding apparatus 1000 may include a motion prediction unit 111, a motion compensation unit 112, an intra-prediction unit 120, a switch 115, a subtractor 125, a transform unit 130, a quantization unit 140, an entropy encoding unit 150, an inverse quantization unit 160, an inverse transform unit 170, an adder 175, a filter unit 180, and a reference picture buffer 190.

In accordance with an embodiment, at least some of the selection unit 1010, the computation unit 1020, the motion prediction unit 111, the motion compensation unit 112, the intra-prediction unit 120, the switch 115, the subtractor 125, the transform unit 130, the quantization unit 140, the entropy encoding unit 150, the inverse quantization unit 160, the inverse transform unit 170, the adder 175, the filter unit 180, and the reference picture buffer 190 may be program modules, and may be capable of communicating with an external device or an external system. The program modules may be included in the encoding apparatus 1000 in the form of operating systems, application program modules, or additional program modules.

The program modules may be physically stored in various well-known storage devices. Further, at least some of the program modules may be stored in a remote storage device capable of communicating with the encoding apparatus 1000.

The program modules may include, but are not limited to, a routine, a subroutine, a program, an object, a component, and a data structure for performing functions or operations according to an embodiment or for executing abstract data types according to an embodiment. Each of the program modules may be implemented using instructions or codes that are executed by at least one processor of the library loading detection apparatus 100.

The program modules may be implemented as instructions or code executed by at least one processor of the encoding apparatus 1000.

Figure 15:
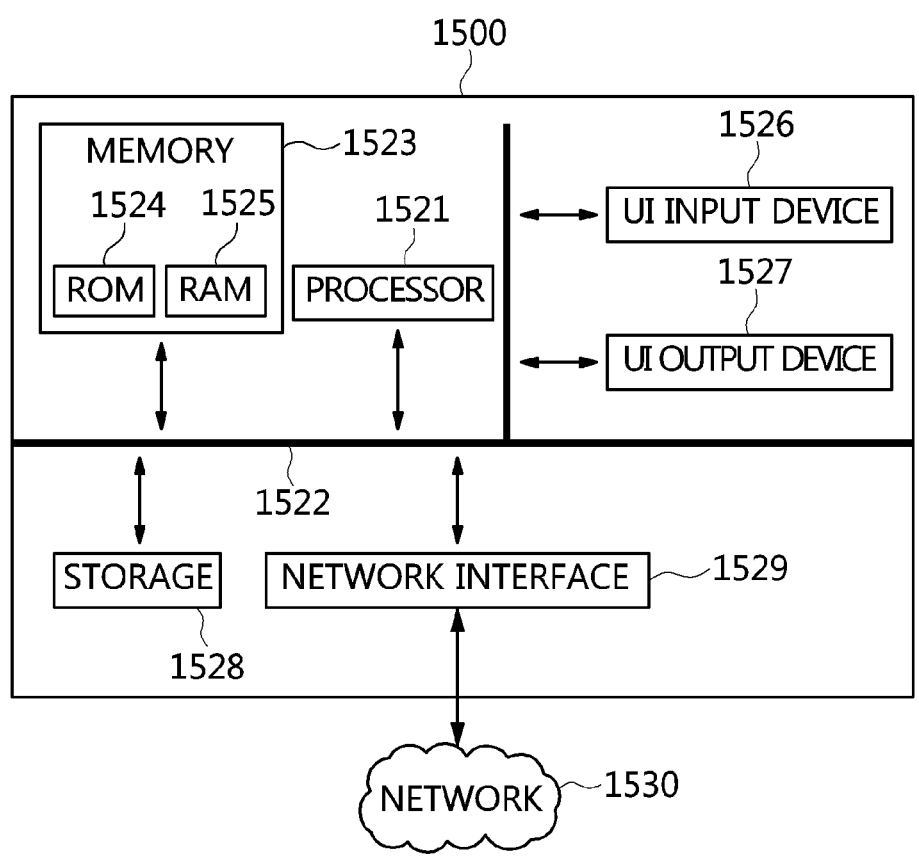
FIG. 15 illustrates an electronic device in which the encoding apparatus according to the embodiment is implemented.

FIG. 15 illustrates an electronic device in which the encoding apparatus according to the embodiment is implemented.

The encoding apparatus 1000 may be implemented as an electronic device 1500 shown in FIG. 15. The electronic device 1500 may be a general-purpose computer system that acts as the encoding apparatus 1000.

As shown in FIG. 15, the electronic device 1500 may include at least one processor 1521, memory 1523, a User Interface (UI) input device 1526, a UI output device 1527, and storage 1528, which communicate with each other through a bus 1522. The electronic device 1500 may further include a network interface 1529 connected to a network 1530. The processor 1521 may be a semiconductor device for executing processing instructions stored in a Central Processing Unit (CPU), the memory 1523 or the storage 1528. The memory 1523 and the storage 1528 may be any of various types of volatile or nonvolatile storage media. For example, the memory may include at least one of Read Only Memory (ROM) 1524 and Random Access Memory (RAM) 1525.

The encoding apparatus 1000 may be implemented in a computer system including a computer-readable storage medium.

The storage medium may store at least one module required by the electronic device 1500 to function as the encoding apparatus 1000. The memory 1523 may store at least one module, and may be configured to be accessed by the at least one processor 1521.

The functions of the encoding apparatus 1000 related to data or information communication may be performed via the network interface 1529.

The apparatus described herein may be implemented using hardware components, software components, or a combination thereof. For example, the device and components described in the embodiments may be implemented using one or more general-purpose or special purpose computers, for example, a processor, a controller, an arithmetic logic unit (ALU), a digital signal processor, a microcomputer, a field programmable array (FPA), a programmable logic unit (PLU), a microprocessor or any other device capable of responding to and executing instructions. The processing device may run an operating system (OS) and one or more software applications that run on the OS. The processing device may also access, store, manipulate, process, and create data in response to execution of the software. For convenience of understanding, the use of a single processing device is described, but those skilled in the art will understand that a processing device may comprise multiple processing elements and multiple types of processing elements. For example, a processing device may include multiple processors or a single processor and a single controller. Also, different processing configurations, such as parallel processors, are possible.

The software may include a computer program, code, instructions, or some combination thereof, and it is possible to configure processing devices or to independently or collectively instruct the processing devices to operate as desired. Software and data may be embodied permanently or temporarily in any type of a machine, a component, physical or virtual equipment, a computer storage medium, a device, or in a propagated signal wave in order to provide instructions or data to the processing devices or to be interpreted by the processing devices. The software may also be distributed in computer systems over a network such that the software is stored and executed in a distributed method. In particular, the software and data may be stored in one or more computer readable recording media.

The methods according to the above-described embodiments may be implemented as a program that can be executed by various computer means. In this case, the program may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

In accordance with the embodiments, there are provided an apparatus and method for rapidly determining an encoding mode.

Further, there are an apparatus and method that use similar rate-distortion costs, thus enabling the mode for block encoding to be determined, without calculating rate-distortion costs of individual modes.

Although the preferred embodiments have been disclosed based on a limited number of embodiments and drawings, those skilled in the art will appreciate that various modifications, additions and substitutions are possible. For example, even if the above-described technologies are performed in a sequence differing from that of the described method, and/or components such as a system, a structure, a device, and a circuit are coupled or combined in a way differing from that of the described method or are replaced with or substituted by other components or equivalents, suitable results can be achieved.

What is claimed is:

1. An encoding apparatus, comprising:
a hardware processor configured to
select an encoding mode to be used to encode a target block from among multiple modes; and
perform computation for rate-distortion optimization in the encoding mode,
wherein the hardware processor calculates a rate-distortion cost of at least one of the multiple modes in relation to encoding of the target block, and selects the encoding mode from among the multiple modes, based on the cost, the multiple modes comprise an inter mode, and
the hardware processor determines whether to perform prediction in the inter mode upon encoding the target block, based on both a level of a Hadamard value in the inter mode and a first threshold function.

2. The encoding apparatus of claim 1, wherein the multiple modes comprise a skip mode, a merge mode, an inter mode, and an intra mode.

3. The encoding apparatus of claim 1, wherein:
the hardware processor calculates costs of the multiple modes in relation to encoding of the target block, and
the encoding mode is a mode having a minimum cost among the multiple costs.

4. The encoding apparatus of claim 1, wherein the cost is a similar rate-distortion cost that is a value related to rate-distortion cost when the mode is used for encoding the target block.

5. The encoding apparatus of claim 1, wherein the cost is calculated based on a model parameter for the corresponding mode, a Hadamard value in the mode, a Lagrangian multiplier in the mode, and a number of bits occurring in the mode.

6. The encoding apparatus of claim 5, wherein the Hadamard value is calculated based on both the target block and a prediction block for the target block.

7. The encoding apparatus of claim 1, wherein:
the cost is a sum of a first value and a second value,
the first value is a product of a model parameter for the corresponding mode and a Hadamard value in the mode, and
the second value is a product of a Lagrangian multiplier in the mode and an estimated value of a number of bits required for description of the mode.

8. The encoding apparatus of claim 1, wherein the cost of the mode is calculated without using a reconstructed block for the target block.

9. The encoding apparatus of claim 1, wherein:
the multiple modes comprise a merge mode and a skip mode, and
the hardware processor determines whether the encoding mode of the target block is the skip mode, using a prediction block in the merge mode and the target block.

10. The encoding apparatus of claim 1, wherein:
the multiple modes comprise a merge mode and a skip mode, and
the hardware processor determines the encoding mode of the target block to be the skip mode when a level of a Hadamard value in the merge mode is 0.

11. The encoding apparatus of claim 1, wherein the hardware processor is configured to, when a level of a Hadamard value in the corresponding mode is equal to or greater than a predefined value, perform motion compensation at a depth subsequent to a current depth of the target block without performing motion compensation at the current depth.

12. An encoding apparatus, comprising:
a hardware processor configured to
select an encoding mode to be used to encode a target block from among multiple modes; and
perform computation for rate-distortion optimization in the encoding mode,
wherein the hardware processor calculates a rate-distortion cost of at least one of the multiple modes in relation to encoding of the target block, and selects the encoding mode from among the multiple modes, based on the cost,
the multiple modes comprise a skip mode, a merge mode, an inter mode, and an intra mode,
the hardware processor sets modes such that prediction in the skip mode and in the merge mode is performed, and such that prediction of the target block in the inter mode is performed while prediction of the target block in the intra mode is omitted if a level of a Hadamard value in the inter mode is in a high cost state, and
the high cost state indicates a state in which the level of the Hadamard value in the inter mode has a value that causes prediction to be performed at a subsequent depth of the target block.

13. The encoding apparatus of claim 12, wherein the hardware processor determines whether to perform prediction in the intra mode depending on a result of prediction in the inter mode.

14. The encoding apparatus of claim 12, wherein the hardware processor determines whether to omit prediction in the intra mode and to perform prediction in the inter mode upon encoding the target block, based on both the level of the Hadamard value in the inter mode and a second threshold function.

15. The encoding apparatus of claim 1, wherein:
the multiple modes comprise a merge mode and an inter mode, and
the hardware processor determines whether to perform prediction in the inter mode, using both a prediction block in the merge mode and the target block.

16. The encoding apparatus of claim 1, wherein:
the multiple modes comprise a merge mode and an inter mode, and
the hardware processor determines whether to perform prediction in the inter mode, using both a prediction block in the merge mode and the target block if a Hadamard value in the merge mode is in a high cost state.

17. The encoding apparatus of claim 1, wherein:
the multiple modes comprise a skip mode, a merge mode, an inter mode, and an intra mode, and
the hardware processor determines a mode in which motion compensation is to be performed, among the multiple modes, using both the target block and a prediction block for the target block if levels of Hadamard values in the multiple modes are identical to each other.

18. The encoding apparatus of claim 1, wherein the hardware processor does not perform computation for rate-distortion optimization in modes other than a mode selected as the encoding mode, from among the multiple modes.

19. An encoding method, comprising:
selecting an encoding mode to be used to encode a target block from among multiple modes; and
performing computation for rate-distortion optimization in the selected encoding mode,
wherein selecting the encoding mode comprises:
calculating a rate-distortion cost of at least one of the multiple modes in relation to encoding of the target block; and
selecting the encoding mode from among the multiple modes, based on the cost,
the multiple modes comprise an inter mode, and
whether to perform prediction in the inter mode upon encoding the target block is determined based on both a level of a Hadamard value in the inter mode and a first threshold function.

* * * * *